United States Patent
Guniguntala et al.

(10) Patent No.: US 11,106,579 B2
(45) Date of Patent: Aug. 31, 2021

(54) SYSTEM AND METHOD TO MANAGE AND SHARE MANAGED RUNTIME MEMORY FOR JAVA VIRTUAL MACHINE

(71) Applicant: INTERNATIONAL BUSINESS MACHINES CORPORATION, Armonk, NY (US)

(72) Inventors: Dinakar Guniguntala, Bangalore (IN); Ashutosh Mehra, Bangalore (IN); Parameswaran Selvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/696,148

(22) Filed: Nov. 26, 2019

(65) Prior Publication Data

US 2020/0102704 A1  Apr. 2, 2020

Related U.S. Application Data

(63) Continuation of application No. 15/665,778, filed on Aug. 1, 2017, now Pat. No. 10,565,104.

(51) Int. Cl.
*G06F 12/02* (2006.01)
*G06F 9/455* (2018.01)
*G06F 11/30* (2006.01)

(52) U.S. Cl.
CPC ...... *G06F 12/0253* (2013.01); *G06F 9/45504* (2013.01); *G06F 11/3037* (2013.01); *G06F 2212/1041* (2013.01); *G06F 2212/152* (2013.01)

(58) Field of Classification Search
None
See application file for complete search history.

(56) References Cited

U.S. PATENT DOCUMENTS 8,949,295 B2  2/2015 McDougall et al.
9,336,031 B2  5/2016 Hackett et al.
(Continued)

OTHER PUBLICATIONS

Berger, Emery D. et al.; CRAMM: Cooperative Robust Automatic Memory Management; URL: http://citeseerx.ist.psu.edu/viewdoc/download?doi=10.1.1.110.9744&rep=rep1&type=pdf; retrieved from the Internet Nov. 26, 2016; 20 pages.
(Continued)

*Primary Examiner* — Nathan Sadler
(74) *Attorney, Agent, or Firm* — Schmeiser, Olsen & Watts; William H. Hartwell

(57) ABSTRACT

A method and system for self-regulating memory of a JAVA virtual machine optimizes memory use by the JVM and by an operating system. A computer running a garbage collector extension monitors and records free committed memory of the JVM at predetermined intervals over time to define a historical record. The computer calculates an average allocation of the free committed memory in the historical record over predetermined intervals. An allocation rate is determined, wherein the allocation rate is based on the average allocation over the predetermined intervals. The computer calculates an estimated time to exhaust committed memory based on free committed heap memory and the allocation rate. Memory is recovered from the operating system if the time to exhaust committed memory is below a first predetermined threshold value and is released to the operating system when said time to exhaust committed memory is above a second predetermined threshold value.

20 Claims, 17 Drawing Sheets

(56) References Cited

U.S. PATENT DOCUMENTS

| | | | |
|---|---|---|---|
| 10,565,104 B2* | 2/2020 | Guniguntala | G06F 12/0253 |
| 2005/0102657 A1 | 5/2005 | Lewis | |
| 2005/0149589 A1 | 7/2005 | Bacon | |
| 2005/0240641 A1 | 10/2005 | Kimura | |
| 2007/0136402 A1 | 6/2007 | Grose | |
| 2008/0301504 A1 | 12/2008 | Chen | |
| 2011/0107050 A1 | 5/2011 | Vengerov | |
| 2012/0137101 A1 | 5/2012 | Arcese | |
| 2012/0284729 A1 | 11/2012 | Sharda | |
| 2013/0275965 A1 | 10/2013 | Dawson et al. | |
| 2014/0324924 A1* | 10/2014 | Ahad | G06F 12/0253 707/813 |
| 2015/0026428 A1 | 1/2015 | Bobroff | |
| 2015/0363114 A1 | 12/2015 | Bobroff et al. | |
| 2015/0363133 A1 | 12/2015 | Bobroff | |
| 2017/0308449 A1* | 10/2017 | Mangione-Tran | G06F 9/5022 |
| 2019/0042406 A1 | 2/2019 | Guniguntala | |

OTHER PUBLICATIONS

Bobroff, Norman et al.; Active Control of Memory for Java Virtual Machines and Applications; 11th International Conference on Autonomic Computing; Jun. 18-20, 2014; pp. 97-103.

Dujack, Jared L.; List of IBM Patents or Patent Applications Treated as Related; Nov. 26, 2019; 1 page.

Fydorenchyk, Tetiana; Java Garbage Collection in Jelastic Cloud; URL: https://dzone.com/articles/java-garbage-collection-1; Apr. 25, 2014; 13 pages.

Spinner, Simon et al.; Proactive Memory Scaling of Virtualized Applications; 2015 IEEE 8th International Conference on Cloud Computing; Jun. 27-Jul. 2, 2015; 8 pages.

* cited by examiner

Dynamic Heap management Data

| Collection (GC count) | Tenured heap size | Free tenured heap | Actual Free in the heap | Allocation in the previous interval | Average | standard deviation | allocation rate | Time to Fill up | Free memory that can be shared | Free memory that can be shared | Free memory that can be shared | Free memory to be shared (if no recovery) |
|---|---|---|---|---|---|---|---|---|---|---|---|---|
| 1 | 6442450944 | 6439249944 | 260,165,894 | | | | | | | | | |
| 2 | 6442450944 | 6437825824 | 6,437,825,824 | 1,424,120 | | | | | | | | |
| 3 | 6442450944 | 6437763032 | 8,437,763,032 | 62,792 | | | | | | | | |
| 4 | 6442450944 | 6435329192 | 6,435,329,192 | 2,433,840 | | | | | | | | |
| 5 | 6442450944 | 6434948816 | 6,434,948,816 | 380,376 | | | | | | | | |
| 6 | 6442450944 | 6432860144 | 6,432,860,144 | 2,088,672 | | | | | | | | |
| 7 | 6442450944 | 6432674592 | 6,432,674,592 | 185,552 | | | | | | | | |
| 8 | 6442450944 | 6432236256 | 6,432,236,256 | 438,336 | | | | | | | | |
| 9 | 6442450944 | 6430172432 | 6,430,172,432 | 2,053,824 | | | | | | | | |
| 10 | 6442450944 | 6315767792 | 6,315,767,792 | 114,404,640 | 12,348,215 | 37,767,955 | 50,115,870 | 126.02 | 3,809,974,306 | 3,809,974,306 | 3,809,974,306 | 3,809,974,306 |
| 11 | 6442450944 | 6306129260 | 6,306,129,260 | 9,638,432 | 13,169,646 | 37,531,878 | 50,701,525 | 49.23 | 0 | 0 | 0 | 0 |
| 12 | 6442450944 | 6209080944 | 6,209,080,944 | 97,048,416 | 22,866,208 | 45,831,242 | 68,669,451 | 34.92 | 0 | 0 | 0 | 0 |
| 13 | 6442450944 | 6176321992 | 6,176,321,992 | 32,758,952 | 25,900,720 | 45,038,871 | 70,939,591 | 33.36 | 0 | 0 | 0 | 0 |
| 14 | 6442450944 | 6092528936 | 6,092,528,936 | 83,793,056 | 34,241,988 | 47,004,068 | 81,246,056 | 28.09 | 0 | 0 | 0 | 0 |
| 15 | 6442450944 | 6072117480 | 6,072,117,480 | 20,411,456 | 36,074,266 | 45,628,637 | 81,702,904 | 27.88 | 0 | 0 | 0 | 0 |
| 16 | 6442450944 | 6027638952 | 6,027,638,952 | 44,478,528 | 40,503,584 | 43,108,484 | 83,610,048 | 29.52 | 0 | 0 | 0 | 0 |
| 17 | 6442450944 | 5961637984 | 5,961,637,984 | 66,000,968 | 47,059,827 | 40,066,390 | 87,126,217 | 24.70 | 0 | 0 | 0 | 0 |
| 18 | 6442450944 | 5933390856 | 5,933,390,856 | 28,247,128 | 49,678,158 | 38,779,427 | 86,457,585 | 24.56 | 0 | 0 | 0 | 0 |
| 19 | 6442450944 | 5879305608 | 5,879,305,608 | 54,085,248 | 43,646,218 | 29,398,740 | 73,042,959 | 28.33 | 0 | 0 | 0 | 0 |
| 20 | 6442450944 | 5812168872 | 5,812,168,872 | 67,136,736 | 48,396,049 | 25,941,272 | 75,337,321 | 26.58 | 0 | 0 | 0 | 0 |
| 21 | 6442450944 | 5748371488 | 5,809,367,162 | 63,797,384 | 48,070,946 | 21,102,111 | 57,173,056 | 28.86 | 0 | 5,661,899 | 5,661,899 | 5,661,899 |
| 22 | 6442450944 | 5700590272 | 5,844,823,057 | 47,781,216 | 47,573,172 | 20,028,843 | 57,602,015 | 27.88 | 0 | 47,781,216 | 0 | 0 |
| 23 | 6442450944 | 5668419660 | 5,862,763,476 | 32,170,592 | 42,410,926 | 17,283,550 | 59,674,476 | 31.05 | 0 | -79,951,808 | 0 | 0 |
| 24 | 6442450944 | 5628530464 | 5,812,884,260 | 39,889,216 | 44,356,702 | 14,485,254 | 58,853,955 | 30.80 | 0 | -119,841,024 | 0 | 0 |
| 25 | 6442450944 | 5548570008 | 5,734,923,800 | 79,960,456 | 47,906,894 | 17,531,121 | 55,438,015 | 28.48 | 0 | -199,801,480 | 0 | 0 |
| 26 | 6442450944 | 5490318336 | 5,674,662,131 | 58,251,672 | 47,131,965 | 17,007,965 | 54,139,930 | 26.11 | 0 | -258,053,152 | 0 | 0 |
| 27 | 6442450944 | 5454220712 | 5,636,464,507 | 36,097,624 | 47,917,014 | 15,772,660 | 63,669,674 | 26.73 | 0 | -294,150,776 | 0 | 0 |
| 28 | 6442450944 | 5414158792 | 5,596,022,587 | 40,061,920 | 48,514,582 | 16,360,558 | 62,875,240 | 25.42 | 0 | -334,212,696 | 0 | 0 |
| 29 | 6442450944 | 5355678408 | 5,549,442,202 | 58,480,384 | 45,649,046 | 15,574,030 | 61,223,076 | 25.15 | 0 | -392,693,080 | 0 | 0 |
| 30 | 6442450944 | 5291184560 | 5,475,648,353 | 64,493,848 | 45,718,593 | 15,648,677 | 61,367,370 | 24.94 | 0 | -457,186,928 | 0 | 0 |
| 31 | 6442450944 | 5239523280 | 5,423,887,915 | 51,661,280 | 46,106,699 | 15,608,555 | 61,715,254 | 23.07 | 0 | -508,848,208 | 0 | 0 |
| 32 | 6442450944 | 5190111096 | 5,374,478,860 | 49,412,184 | 47,830,858 | 13,946,508 | 61,777,366 | 22.25 | 0 | -558,260,392 | 0 | 0 |

Dynamic Heat management Data – cont'd

| | | | | | | | | | | |
|---|---|---|---|---|---|---|---|---|---|---|
| 105 | 6442450944 | 3557877696 | | 10,291,344 | 11,435,889 | 6,571,154 | 18,007,043 | 66.71 | 300,974,439 | -731,498,680 | 0 |
| 106 | 6442450944 | 3570283344 | | 17,594,352 | 12,056,549 | 6,735,160 | 18,801,709 | 62.96 | 243,646,818 | -748,003,032 | 0 |
| 107 | 6442450944 | 3559330040 | | 10,953,304 | 12,260,178 | 6,607,098 | 18,867,277 | 62.16 | 229,415,117 | -759,956,336 | 0 |
| 108 | 6442450944 | 3548427816 | | 10,902,424 | 12,353,444 | 6,549,712 | 18,903,156 | 61.46 | 216,718,716 | -770,858,760 | 0 |
| 109 | 6442450944 | 3526208248 | | 22,218,368 | 13,320,712 | 7,102,116 | 20,422,828 | 55.80 | 118,516,749 | -793,077,128 | 0 |
| 110 | 6442450944 | 3514039776 | | 12,169,472 | 11,551,348 | 4,312,565 | 15,863,913 | 124.67 | 1,184,535,906 | 44,998,298 | 44,996,298 |
| 111 | 6442450944 | 3509494776 | | 4,545,000 | 10,775,044 | 5,129,979 | 15,905,023 | 124.06 | 1,177,935,433 | 40,451,298 | 40,451,298 |
| 112 | 6442450944 | 3505437814 | | 4,056,872 | 10,129,942 | 5,770,817 | 15,900,759 | 123.84 | 1,174,091,766 | 36,394,426 | 36,394,426 |
| 113 | 6442450944 | 3497881800 | | 7,556,104 | 10,028,724 | 5,839,191 | 15,867,915 | 123.62 | 1,166,177,872 | 28,838,322 | 28,838,322 |
| 114 | 6442450944 | 3488892208 | | 8,989,562 | 8,898,549 | 5,878,912 | 15,777,460 | 123.76 | 1,163,710,992 | 19,948,730 | 19,948,730 |
| 115 | 6442450944 | 3482869368 | | 6,022,840 | 8,741,398 | 5,509,814 | 14,251,211 | 136.59 | 1,234,000,608 | 13,825,890 | 13,825,890 |
| 116 | 6442450944 | 3477884512 | | 4,984,856 | 8,144,553 | 5,697,799 | 13,842,352 | 140.28 | 1,248,458,723 | 8,841,034 | 8,841,034 |
| 117 | 6442450944 | 3469727828 | | 8,156,584 | 7,868,968 | 5,658,567 | 13,529,535 | 142.90 | 1,256,942,956 | 584,450 | 584,450 |
| 118 | 6442450944 | 3466032056 | | 3,889,872 | 6,017,719 | 2,785,351 | 8,803,070 | 219.21 | 1,499,570,362 | -3,011,422 | 0 |
| 119 | 6442450944 | 3454736024 | | 11,296,032 | 5,930,375 | 2,577,915 | 8,508,291 | 225.46 | 1,493,013,280 | -14,307,454 | 0 |
| 120 | 6442450944 | 3449835136 | | 4,900,868 | 5,965,954 | 2,546,180 | 8,511,124 | 224.83 | 1,487,970,747 | -19,208,342 | 0 |
| 121 | 6442450944 | 3438261024 | | 11,574,112 | 6,717,688 | 2,814,794 | 9,532,482 | 199.52 | 1,425,328,747 | -30,762,454 | 0 |
| 122 | 6442450944 | 3428842768 | | 9,318,256 | 6,893,903 | 2,882,467 | 9,776,370 | 193.59 | 1,403,818,068 | -40,100,710 | 0 |
| 123 | 6442450944 | 3412125248 | | 16,817,520 | 7,676,696 | 4,209,431 | 11,886,127 | 157.82 | 1,281,510,706 | -56,918,230 | 0 |
| 124 | 6442450944 | 3403458600 | | 8,566,848 | 7,941,077 | 4,103,542 | 12,044,619 | 155.02 | 1,284,919,475 | -65,584,878 | 0 |
| 125 | 6442450944 | 3399978824 | | 3,479,776 | 7,790,568 | 4,305,240 | 12,095,808 | 154.08 | 1,288,880,212 | -69,064,654 | 0 |
| 126 | 6442450944 | 3397180144 | | 2,798,680 | 7,264,778 | 4,732,227 | 11,997,005 | 155.24 | 1,261,521,659 | -71,863,334 | 0 |
| 127 | 6442450944 | 3395598712 | | 1,581,432 | 7,043,334 | 5,019,773 | 12,063,107 | 154.13 | 1,256,135,188 | -73,444,786 | 0 |
| 128 | 6442450944 | 3391961818 | | 3,636,896 | 6,277,421 | 5,087,160 | 11,284,581 | 164.44 | 1,291,424,557 | -77,081,662 | 0 |
| 129 | 6442450944 | 3388481704 | | 3,480,112 | 6,135,343 | 5,102,218 | 11,237,561 | 164.82 | 1,280,295,460 | -80,561,774 | 0 |
| 130 | 6442450944 | 3384674312 | | 3,807,392 | 5,358,671 | 4,847,512 | 10,206,183 | 181.10 | 1,338,056,981 | -84,369,166 | 0 |
| 131 | 6442450944 | 3381488564 | | 3,185,648 | 4,745,410 | 4,745,454 | 9,490,865 | 194.42 | 1,370,637,226 | -87,554,814 | 0 |
| 132 | 6442450944 | 3379254840 | | 2,233,624 | 3,287,041 | 2,014,770 | 5,301,811 | 347.61 | 1,577,856,098 | -89,788,638 | 0 |
| 133 | 6442450944 | 3375245456 | | 4,009,384 | 2,821,314 | 794,347 | 3,615,661 | 508.60 | 1,658,154,186 | -93,798,022 | 0 |
| 134 | 6442450944 | 3374688528 | | 555,928 | 2,528,930 | 1,152,690 | 3,681,620 | 499.34 | 1,654,300,341 | -94,353,950 | 0 |
| 135 | 6442450944 | 3367106616 | | 4,878,912 | 2,746,953 | 1,360,413 | 4,107,366 | 446.37 | 1,628,034,118 | -98,332,862 | 0 |
| 136 | 6442450944 | 3363431072 | | 6,279,544 | 3,215,764 | 1,604,922 | 4,821,686 | 376.94 | 1,586,038,580 | -105,612,406 | 0 |
| 137 | 6442450944 | 3360468136 | | 2,962,936 | 3,149,366 | 1,617,305 | 4,766,673 | 382.69 | 1,585,826,258 | -108,575,342 | 0 |
| 138 | 6442450944 | 3357747760 | | 2,720,376 | 3,773,394 | 2,629,166 | 6,402,560 | 263.39 | 1,494,311,563 | -118,295,718 | 0 |
| 139 | 6442450944 | 3348832432 | | 3,915,328 | 3,784,188 | 2,627,434 | 6,411,622 | 282.38 | 1,499,943,128 | -122,211,046 | 0 |
| 140 | 6442450944 | 3345388032 | | 1,444,400 | 3,610,063 | 2,771,981 | 6,382,044 | 263.46 | 1,489,977,630 | -123,655,446 | 0 |

Dynamic Heap management Data – cont'd
| | | | | | | | | | |
|---|---|---|---|---|---|---|---|---|---|
| 141 | 6442450944 | 3343723784 | 3407,813,289 | 1,864,248 | 3,880,188 | 2,823,652 | 6,378,757 | 283.44 | 1,488,577,717 | -125,319,694 |
| 142 | 6442450944 | 3334598640 | 3758,590,445 | 8,825,144 | 4,884,882 | 3,258,429 | 7,294,111 | 246.58 | 1,433,884,919 | -134,144,838 |
| 143 | 6442450944 | 3323814576 | 3767,588,381 | 11,084,064 | 5,087,498 | 3,550,138 | 8,637,834 | 206.94 | 1,355,624,704 | -145,228,902 |
| 144 | 6442450944 | 3313450160 | 3777,741,968 | 10,364,416 | 5,826,048 | 3,862,492 | 9,488,537 | 187.29 | 1,302,715,108 | -156,593,318 |
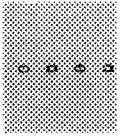
FIG. 9 – cont'd

SYSTEM AND METHOD TO MANAGE AND SHARE MANAGED RUNTIME MEMORY FOR JAVA VIRTUAL MACHINE

CROSS REFERENCE TO RELATED APPLICATIONS

This application is a continuation application claiming priority to Ser. No. 15/655,778 filed Aug. 1, 2017, now U.S. Pat. No. 10,565,104 issued Feb. 18, 2020, the contents of which are hereby incorporated by reference.

TECHNICAL FIELD

The present disclosure generally relates to computer memory management, and more particularly relates to managing use of computer memory of a Java virtual machine by one or more applications in an information processing system.

BACKGROUND

Programming languages such as Java, C++, Lisp, Smalltalk, and several scripting languages allocate memory from such an area known as the heap (or heap memory). At any given time, some parts of the heap may be in use while parts may be "free" (i.e., unused) and thus available for future allocations. In order to free memory from the heap, garbage collection is needed. A key problem with such environments is that memory overhead is a significant factor.

Programmers cannot manually allocate or deallocate memory objects. Programmers need to rely on garbage collectors (i.e., one or more garbage collectors are normally available in the operating system) to free up memory which is no longer being used. In many cases, this can result in excess memory being allocated to the heap.

Such excess heap memory being allocated to one or more applications operating in a computer system environment can create serious memory management problems for the computer system. These problems are particularly difficult to deal with in situations in which multiple applications are running on the same computer system, and the applications are all competing for memory. For example, multiple Java virtual machines (JVM) might be running on the same information processing system concurrently, competing with each other for memory (as well as other resources). The idea is to allocate memory efficiently across all applications. Memory should be properly distributed across all of the JVMs on the system. A key problem is how to allocate memory across the system for optimal performance among all of the JVMs.

Java allocates memory from an area known as the heap. In order to free memory from the heap, garbage collection is needed. The garbage collector, or just collector, attempts to reclaim garbage, or memory occupied by objects that are no longer in use by the program.

In summary, memory management is the process of managing computer memory, including mechanisms to dynamically allocate portions of memory to programs upon request and freeing memory for reuse when no longer needed. Memory requests are satisfied by allocating portions from a large pool of memory referred to as "the heap", and, at any given time, some parts of the heap are in use while some are "free" (i.e., unused) and thus available for future allocations. While ideally memory should be properly distributed across all of the JVMs on the system, conventional system have failed to do this in an optimal fashion. Conventional system designs regularly struggle with how to allocate memory across the system for optimal performance among all of the JVMs, with often less than satisfactory results.

Garbage collection is a form of automatic memory management that attempts to reclaim "garbage", as referring to memory occupied by objects that are no longer in use by a program. Garbage collection is often portrayed as the opposite of manual memory management, a mechanism in which the programmer specifies which objects to deallocate and return to the memory system. Many computer languages, such as Java, C++, and several scripting languages, require garbage collection either as part of the language specification or effectively for practical implementation, while other languages, such as C, C++, were designed for use with manual memory management but have garbage collected implementations available. Still others, such as Ada, Modula-3, and C++/CLI allow both garbage collection and manual memory management to co-exist in the same application by using separate heaps, and others, such as D, are garbage collected while allowing the user to manually delete objects and disable garbage collection when speed is required.

SUMMARY

The present invention provides a method, and associated computer program product and computer system, for automatically self-regulating memory for at least one JAVA virtual machines (JVM) to optimize memory use by the at least one JVM and by an operating system. The computer running a garbage collector extension monitors allocation of free committed memory to at least one JVM at predetermined intervals. The computer records the allocation of the free committed memory to define a historical record of previously committed memory. The computer calculates an average allocation of the free committed memory in the historical record over a selected number of predetermined intervals. The computer determines an allocation rate of the free committed memory, where the allocation rate is based on the average allocation over the selected number of said predetermined intervals. The computer calculates an estimated time to exhaust free committed memory based on a free committed heap memory and the allocation rate. The computer compares the estimated time to exhaust committed memory with first and second predetermined threshold values. The computer recovers memory from the operating system if the time to exhaust committed memory is below the first predetermined threshold value, and the computer releases memory to the operating system when the time to exhaust committed memory is above the second predetermined threshold value.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure. The figures are briefly described as follows.

FIG. 9 illustrates a table of data used as an exemplary dynamic heap management table according to an embodiment of the present invention.

DETAILED DESCRIPTION

Figure 1:
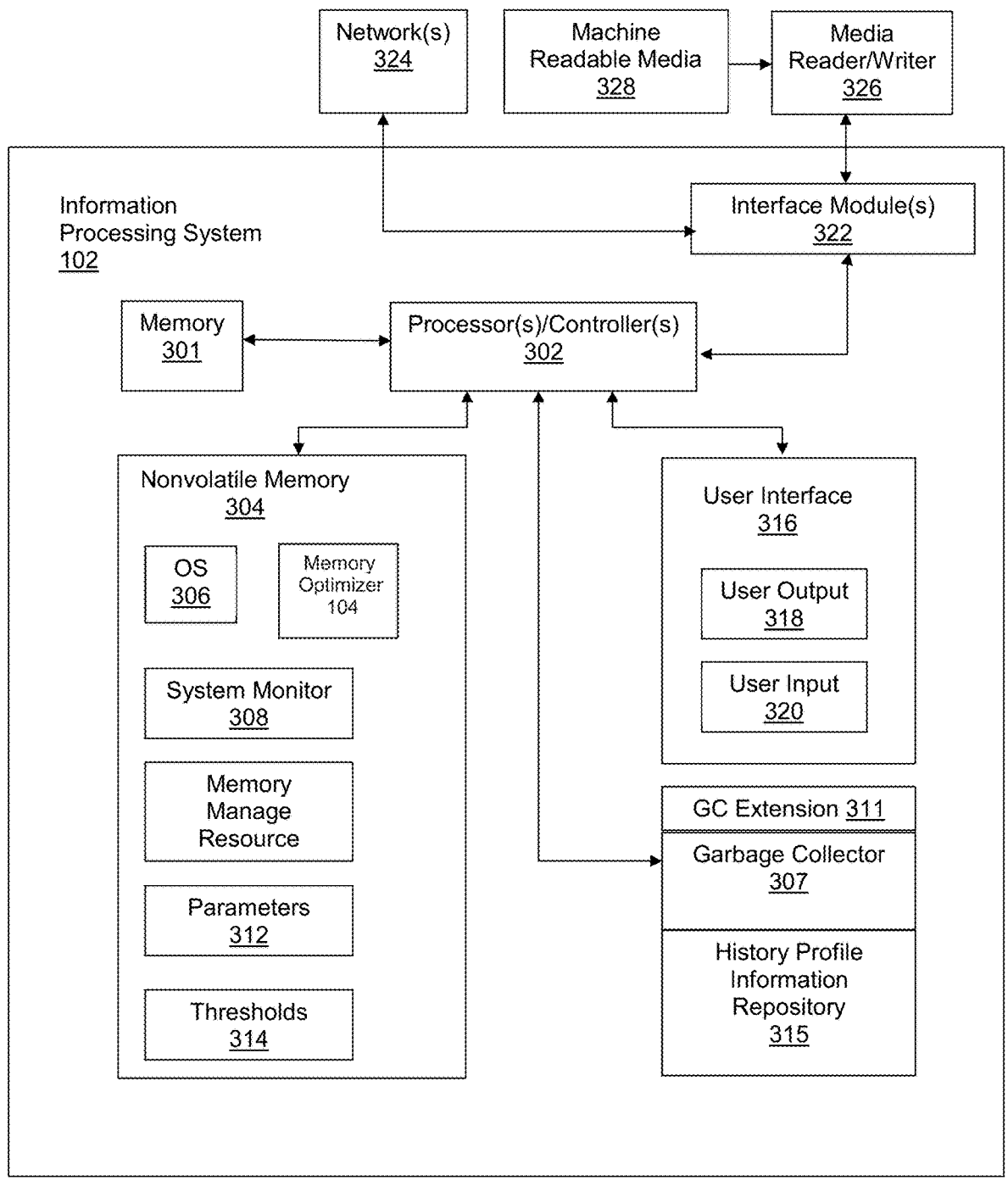
FIG. 1 shows a more detailed view of an embodiment of a computer system according to an embodiment of the present invention.

Managed runtime environments such as the Java Virtual Machine are designed to manage a section of process memory address space by pre-allocating or reserving the memory (the heap) as part of an initialization phase. This can lead to potential issues because, on the one hand, on may have under-utilization where the allocated memory is not fully utilized, and, on the other hand, freeing up excessive memory can cause performance issues.

The JVM is an application as far as the operating system is concerned. All applications allocate memory from the operating system using a system call API; e.g., malloc. On allocation, the OS provides "virtual memory" to the application. This virtual memory need not have physical memory/page backing it. However whenever the application starts writing to the virtual memory, the OS provides a physical memory/page at the time of writing, which is called as "committing" memory; i.e., commit a physical memory page to a virtual memory page. Committing memory is done to help the OS provide physical memory as and when memory is needed and not all at once; e.g., if the application allocates a large chunk of memory from the OS, the application might not need all of the memory at once. Thus, the OS provides virtual memory to the application and then when the application actually makes use of the memory by writing to memory, the OS then supplies physical memory pages, which helps the OS to better manage the physical memory pages across all applications that are requesting memory. The OS also keeps track of which physical pages are in-use (being read from or written to by the application that allocated it) at any given point in time. If a page is not "in-use" for a long time, then the OS swaps the contents of the physical page to the disk (swap partition or swap file) and frees up the physical page. This is called as de-committing memory; i.e., decommit a physical page from a virtual memory page. Later if the application accesses a virtual memory page that has been de-committed, the OS now finds a new physical page (or maybe the same one if the page is still available) and copies in the content of the page from the swap space. All of this OS activity is transparent to the application. Finally the application can release the memory by using "free" system call API. The OS then de-allocates the virtual memory pages as well as de-commits the physical memory pages and puts it back into the free pool.

The Java virtual machine heap is the area of memory used by the JVM for dynamic memory allocation. The management of the heap is either done by the applications themselves, allocating and deallocating memory as required, or by the operating system or other system program. The JVM heap can vary its current heap size between two preconfigured memory boundaries—the initial heap size (defined by the –Xms option) and the maximum heap size (defined by the –Xmx option). The committed memory is a measure of how much memory the JVM heap is really consuming in the guest. If (–Xms<–Xmx) and (used memory=current heap size), the JVM is likely to grow its heap after a full garbage collection. However if (–Xms or current heap size==–Xmx), either through heap growth or configuration, the heap cannot grow any further. It is noted that a guest is an operating system that is running inside a virtual machine instead of on physical hardware.

The heap is where instances of Java classes and arrays are allocated. A java.lang.OutOfMemoryError will be issued when there is not enough memory available for instances of Java classes or arrays. Native memory stacks store conventional stacks, also known as C stacks, to support native methods that are written in a non-Java language such as C/C++. Native memory stacks can be expanded during runtime. If there's not enough memory for the expansion of an existing native memory stack or for the creation of a new native memory stack for a new thread, one would see a javalang.OutOfMemoryError.

By default, the JVM grows or shrinks the heap at each collection to try to keep the proportion of free space to living objects at each collection within a specific range. This target range is set as a percentage by the parameters –XX: MinHeapFreeRatio=<minimum> and –XX: MaxHeapFreeRatio=<maximum>, and the total size is bounded below by –Xms and above by –Xmx. The configuration file Agentry.ini found in Agentry server folder has two settings for heap size under 'JAVA' section: initialHeapSize and maxHeapSize.

The default collector has two generations: the young generation and the tenured generation. Most memory allocations are done in the young generation (minor garbage collection which is swifter). The young generation is optimized for objects that have a short lifetime relative to the interval between collections. Objects that survive several collections in the young generation are moved to the tenured generation. The young generation is typically smaller and is collected more often. The tenured generation is typically larger and collected less often (which is complete GC and takes longer).

Memory allocation refers to reserving memory for specific purposes. Memory allocation is a system characteristic that can be measured. Operating systems and applications generally reserve fixed amounts of memory at startup and allocate more when the processing requires it. If there is not enough free memory to load the core kernel of an application, it cannot be launched. Although a virtual memory function will simulate an almost unlimited amount of memory, there is always a certain amount of "real" memory that is needed.

When an application is programmed, the programmer must typically allocate additional memory as needed and release that memory when that function is no longer used. This is tedious and error prone, as it is easy to forget to deallocate the memory, which then typically remains unused until the program is closed. JVM operating systems perform "garbage collection," whereby they release memory automatically when the content of memory has not been used for some period of time. One of the advantages of the Java environment is that memory allocation (committing memory) and deallocation (de-committing memory) is handled automatically by the Java Virtual Machine.

Free committed memory and free committed heap memory are the same as far as the present disclosure is concerned and are used interchangeably. Free tenured heap size is a subset of the free committed heap memory. Heap memory is usually partitioned into two or more spaces: 1. A space dedicated for short lived objects (heap memory allocation by the Java application); this is usually called as Nursery heap, and 2. A space dedicated for objects that live for long term; this is usually called the tenured heap.

Sometimes there are several such tenured heap spaces depending on how long an object is in-use. Usually all objects are first allocated memory in the Nursery. If the objects live for a pre-determined set of GC cycles, the objects are then moved to the tenured heap, which helps the JVM to better manage the overall heap and maintain the best possible performance for the application. All of the optimizations described in this disclosure are specific to the tenured heap.

For purposes of this invention, free committed memory is the free committed heap memory which is the same as the free tenured heap size as discussed below. The allocation rate is the allocation over time. This invention records the allocation in previous interval of time or intervals of garbage collection. For this invention, the allocation rate combines both the historical allocation as well the current allocation rate. The invention extrapolates the rate at which the remaining free committed heap memory is going to be used up based on the current rate of allocation. Average allocation rate is a calculation of allocation rate over a selected number of predetermined intervals; either time or based on garbage collection, taking into account a statistical analysis utilizing standard deviation.

In a multi runtime environment, whether in the cloud or otherwise, any inefficiencies are exacerbated and can cause both catastrophic performance issues as well as severe underutilization of resources. For example, when multiple JVMs are running in a single system, if one instance uses only a small fraction of the memory that the JVM has reserved, the JVM has an effect of potentially starving other instances or worse reducing the number of instances that can share a given set of resources. At the same time, giving up too much memory can cause the current JVM to stall and cause performance issues. In addition, there may be JVM phases such as when the JVM is in an idle state, when memory should be given up and other times of memory pressure (when the JVM is in an active state), and when circumstance require that one hold onto memory so as to not affect performance. Lastly, the JVM Garbage Collector has to work in conjunction with the Operating System Virtual Memory Manager so as to not cause conflicting behavior such as thrashing, when the OS flushes pages to disk that the GC might use.

In cloud environments, memory is the key constraint which restricts the number of application instances that can be run on a given set of resources. If a way to dynamically share memory exists when memory is not being utilized (even though memory has been reserved by an application), one can make better use of memory and run more application instances for the same set of resources. In this context, if one can predict the rate of allocation of memory for a given application and set a "risk threshold," one can determine how much of memory can be given back to the OS. The "risk threshold" here is represented by how far into the future that the application will hold on to the memory, IOW, the higher the value the more conservative is the sharing/giving back to OS and consequently the lesser the value the more risk being taken to give up memory to the OS.

As required, various detailed embodiments are disclosed herein; however, it is to be understood that the various disclosed embodiments are merely examples, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of embodiments of the disclosure.

According to the present invention, a method and system is provided that predicts the usage of the heap based on checking and recording the memory allocation rate at regular intervals. The allocation rate combines both the historical allocation as well the current allocation rate. The invention next extrapolates the rate at which the remaining free heap memory is going to be used up based on the current rate of allocation. The methodology of the invention helps the system determine how long the free memory is going to last and based on a number of user inputs (such as thresholds, the Max/Min amount of heap that can be freed, etc.), and the system determines the amount of memory that can be either decommitted and given back to the OS or committed back to the heap from the OS. The algorithm described below works closely in conjunction with the Garbage Collection module and will be an extension of the same; called the "GC Extension".

In accordance with the invention, the GC Extension will have access to the core GC metrics, such as current rate of allocation, free heap memory, committed memory, Max heap size, Min heap size, Max free memory that can be freed, Min free memory that can be freed, etc. These parameters are set forth as an example of some important factors used to allocate memory but other parameters may become apparent to those of skill in the art. In practice, the GC Extension reads the free memory and records free memory at regular intervals. The GC extension uses the recorded free memory data for a defined time length to compute average allocation rate and a standard deviation factor from the allocation rate. The GC extension uses these values to project or predict when an Out Of Memory (OOM) event may occur.

If the projected time when the memory is going to be exhausted is above a predetermined (high) threshold, the system may safely give up memory back to the OS even accounting for any sudden spurts in allocation rate. If the projected time is lesser than a predetermined (lower) threshold, the system immediately recovers the memory back from the OS, thus anticipating the memory need before the need arises.

The method and system of this invention further registers for events such as "OOM situation", "High Watermark Memory Threshold", "Application going into Idle state", "Application going into Active state". The system takes appropriate action keeping in mind to free the maximum possible resources without affecting performance. In addition to these events, the system also provides a mechanism to react to high allocation periods pre-determined by profiling the application usage over a period of time. This mechanism and system assumes the existence of an external data store (e.g., called the "application profile store"), which maintains application usage as fed by JVM(s) running the application over regular interval (for example every hour). Another external agent (e.g., called the "application profile analyzer" or APA) has the ability to infer data in application profile store and detect the usage period (e.g., time of day, weekdays or weekends, specific days in year) around certain characteristics. An example of such characteristic is high allocation rate. Thus, the external agent may infer from the data stored in application profile store that the application has high allocation rate starting from 9 AM on weekdays. In this instance, the JVM(s) would register with the application profile analyzer for such specific usage events, in this case high allocation periods. The application profile analyzer is next responsible for notifying the JVM about high allocation usage event(s) in near future. On receiving such notification the JVM(s) would check their heap state and if the JVM has de-committed any heap earlier, the JVM would commit that back (recover from OS) to handle the expected high allocation rate. These and other benefits of the present invention will become apparent from the following description and related drawings.

According to various embodiments of the present disclosure, the garbage collector extension (GC extension) can automatically manage memory allocation for a JVM. As known by those of skill in the art, a component called a garbage collector is part of the JVM itself. If "n" JVMs are running in a system, there would be "n" garbage collectors—each managing heap of a respective JVM.

While various embodiments of the present disclosure are described in terms of using Java applications and a JVM, the new and novel approach to memory management can be applied to many different types of run-time systems and to programming languages, such as Java, which use heap storage and garbage collection such as C++, Lisp, Smalltalk, and various scripting languages.

Various embodiments of the present disclosure are applicable to languages with automatic memory management and garbage collection, such as Java, Lisp, Smalltalk, C++, many scripting languages, etc. Certain embodiments of the present disclosure are applicable to languages which use garbage collection in general. For ease of exposition, various embodiments of the present disclosure will be discussed in terms of Java applications and Java virtual machines (JVM run-time systems). One of ordinary skill in the art will be able to easily apply such discussed various embodiments of the present disclosure to other languages and other run-time systems, that operate with garbage collection.

One feature of various embodiments of the present disclosure is that the value of various memory usage parameters may be varied dynamically for a JVM. A computer system, according to one embodiment, has the ability to cause a JVM to give back heap memory to an operating system. The memory which is returned to the operating system can be used for other things, including additional heap memory for another JVM.

During normal execution (i.e., not during garbage collection), the value of the parameters will either rise as more heap memory is needed for an application or stay the same. Programmers cannot explicitly deallocate heap memory; however, the value of the parameters can decrease as a result of garbage collection.

The garbage collector extension, according to various embodiments, is an extension to existing garbage collector modules of each JVM, which can monitor a respective JVM. If a JVM is consuming too much memory, the garbage collector will expand the heap within limits, and the garbage collector extension performs additional function as will described below. the GC extension will have access to the core GC metrics, such as current rate of allocation, free heap memory, committed memory, Max heap size, Min heap size, Max free memory that can be freed, Min free memory that can be freed, etc. among other operating parameters.

Some garbage collections compact memory, which frees up large blocks of contiguous memory. Other garbage collections do not compact memory. While it is advantageous to compact memory, the drawback is that compaction involves overhead. There is less overhead to performing a garbage collection without compacting memory as compared with performing a garbage collection which compacts memory. Thus, when garbage collection is invoked, memory might be compacted during some of the invocations. For other invocations, memory might not be compacted. A garbage collection which compacts memory is referred to as a compacting garbage collection.

One key difficulty is how to automate this process discussed above. According to various embodiments of the present disclosure, as will be discussed in more detail below, a garbage collector extension is utilized to read the free memory and record free memory at regular intervals. The GC Extension uses the recorded free memory data for a defined length of time to compute average allocation rate and a deviation factor. The GC extension uses these values to project when an Out Of Memory Error may occur.

In cases in which the memory of the system is fully utilized, JVMs might take memory from the operating system at some points and give back memory to the operating system at other points. This is because the heap memory requirements for JVMs can be variable. Thus, the garbage collector extension has the ability to optimize memory for a related JVM depending on operating parameters.

The heap size can affect performance. If the heap size is too small, garbage collection overhead and/or the average CPU overhead to allocate heap objects can go up. Therefore, performance is best if the heap size is not too small.

FIG. 1 shows a detailed view of an embodiment of a computer system according to an embodiment of the present invention. The garbage collector is part of the JVM itself. The extension of the garbage collector is part of the GC and hence also a part of each individual JVM. In particular, FIG. 1 shows an information processing system (e.g., computer system) 102 that is based upon a suitably configured processing system adapted to implement one or more embodiments of the present disclosure. Similarly, any suitably configured processing system can be used as the information processing system 102 by various embodiments of the present disclosure. The information processing system 102 can be a standalone system or reside within a multi-system environment such as a parallel-distributing environment.

The information processing system (e.g., computer system) 102 includes at least one processor/controller 302. The at least one processor(s) 302 is communicatively coupled with a memory 301 and with a non-volatile memory 304. The non-volatile memory 304 can be used to store program, data, and configuration parameters, in persistent memory.

An operating system (OS) 306, according to the present example, is stored in the non-volatile memory 304 and can interoperate with the processor/controller 302 to provide OS operations in the information processing system 102. One of more memory management resources are provided by the OS 306 and made available to be invoked to perform garbage collection, or compacting garbage collection, for one or more heaps in the memory 301.

Additionally, one or more timers (not shown) are provided in the OS 306 that can be used, for example, for keeping track of timed events in the information processing system 102. As one example, the time since the last garbage collection (or compacting garbage collection) can be monitored using the one or more timers (not shown) in the OS 306.

A system monitor 308, according to the present example, is stored in the non-volatile memory 304 and can interoperate with the processor/controller 302 to monitor run-time performance of the information processing system 102 and to collect run-time performance information including, but not limited to, CPU usage, memory usage, and heap usage. The collected run-time performance information is stored and updated in the non-volatile memory 304, such as in the parameters memory 312.

A memory optimizer 104, according to the present example, is stored in the non-volatile memory 304 and can interoperate with the processor/controller 302 to optimize memory management operations in the information processing system 102. Various of the operations performed with the memory optimizer 104 are discussed below.

Included in the runtime are garbage collector 307 and garbage collector extension 311. The garbage collector extension 311, which will be described in more detail below, has knowledge of the garbage collection overhead incurred by the JVM. If the JVM is spending too much memory, the garbage collector extension 311 can raise the maximum heap memory sixe for the JVM as described below.

The various parameters stored in the parameters memory 312 in the non-volatile memory 304, may include a set of thresholds 314 stored in the non-volatile memory 304. Each of the thresholds (also referred to as "threshold values") 314 stores a threshold value that can be monitored and updated by the at least one processor/controller 302.

The garbage collector 307 and/or garbage collector extension 311 maintains profile information like free heap memory and records the memory at regular intervals.

The at least one processor/controller 302 is communicatively coupled with a user interface 316 which includes a user output interface 318 and a user input interface 320. The user interface 316 provides the user input interface 320 for receiving user input communication from a user of the information processing system 102. The user interface 316 provides the user output interface 318 for providing communication to a user of the information processing system 102

The user output interface 318 may include one or more display devices to display information to a user of the system 102. A display device (not shown) can include a monochrome or color Liquid Crystal Display (LCD), Organic Light Emitting Diode (OLED), or other suitable display technology for conveying image information (e.g., text, graphics, icons, etc.) to a user of the information processing system 102. A display device, according to certain embodiments, comprises a graphical user interface (GUI). A display device can include, according to certain embodiments, touch screen technology, e.g., a touchscreen display, which also serves as a user input interface 320 for detecting user input (e.g., touch of a user's finger or of a stylus). One or more speakers in the user output interface 318 can provide audible information to the user, and one or more indicators can provide indication of certain conditions of the computer system 102 to the user. The indicators can be visible, audible, or tactile, thereby providing necessary indication information to the user of the information processing system 102.

The user input interface 320 may include one or more keyboards, keypads, mouse input device, track pad, and other similar user input devices. A microphone is included in the user input interface 320, according to various embodiments, as an audio input device that can receive audible signals from a user. The audible signals can be digitized and processed by audio processing circuits and coupled to the processor/controller 302 for voice recognition applications such as for the information processing system 102 to receive data and commands as user input from a user.

One or more input/output interface modules 322 are communicatively coupled with the processor/controller 302. In this way, the information processing system 102 is able to communicate with other processing systems and devices. For example, the processor/controller 302 is communicatively coupled with interface module(s) 322 that communicatively couple the information processing system 102 with external networks 324 and with a media reader/writer 326. The external networks 324 can include any one or a combination of wired, wireless, local area, and wide area networks.

The media reader/writer 326 can interoperate with the processor/controller 302 to read and write machine (computer) readable media 328 that may be communicatively coupled with the media reader/writer 326. Computer readable media 328, which in the present example comprise a form of computer readable storage medium, may be coupled with the media reader/writer 326 to provide information via the interface module(s) 322 to-from the processor/controller 302 of the information processing system 102. For example, data, configuration parameters, and instructions for the processor/controller 302 may be provided via the computer readable media 328 to the information processing system 102.

The interface module(s) 322 can also connect, for example, mass storage devices to the information processing system 102. One specific type of data storage device is an optical drive such as a CD/DVD drive, which may be used to store data to and read data from a computer readable storage medium such as, but not limited to, a CD/DVD device. Another type of data storage device is a data storage device configured to support, for example, NTFS type file system operations.

Although only one CPU (processor/controller) 302 is illustrated for computer system 102, computer systems with multiple CPUs (processors/controllers) 302 can be used equally effectively. Various embodiments of the present disclosure further incorporate interfaces that each includes separate, fully programmed processors that are used to off-load processing from the CPU 302.

An operating system 306 included in the nonvolatile memory 304 is a suitable multitasking operating system such as any of the operating systems Linux, UNIX, Windows, and Windows Server based operating systems, which optionally may also comprise a multi-processing operating system. Various embodiments of the present disclosure are able to use any other suitable operating system. Some embodiments of the present disclosure utilize architectures, such as an object oriented framework mechanism, that allows instructions of the components of operating system to be executed on any processor/controller 302 located within the information processing system 102. Various embodiments of the present disclosure are able to be adapted to work with any data communications connections including present day analog and/or digital techniques or via a future networking mechanism.

Figure 2:
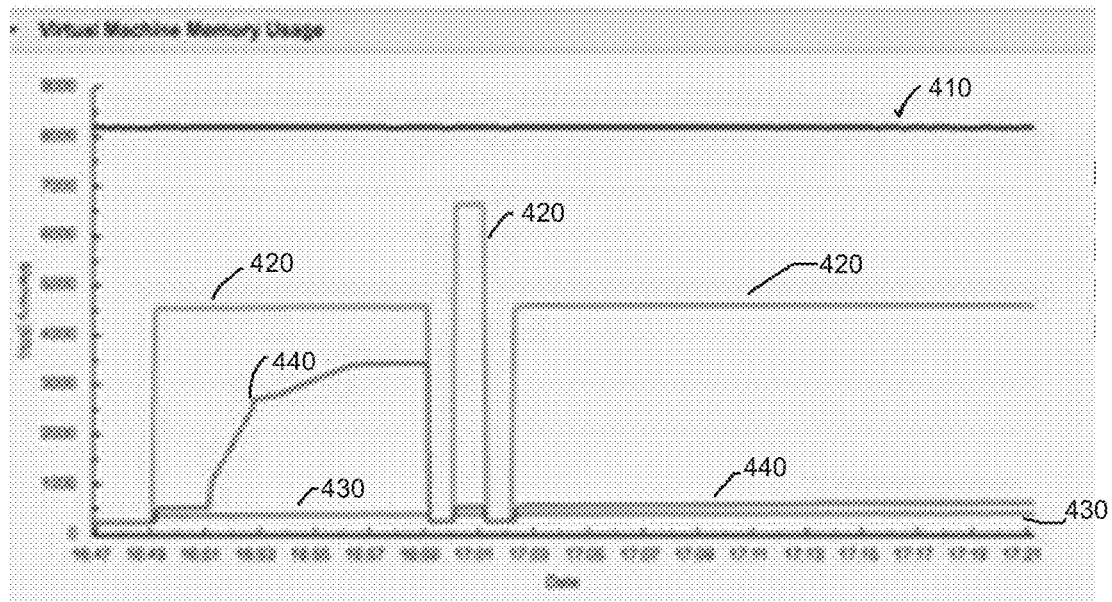
FIG. 2 illustrates a graph of VM memory usage over time, with time displayed on the X-axis and the memory used displayed on the Y-axis according to one embodiment of the present invention.

FIG. 2 illustrates a graph of VM memory usage over time, with time displayed on the X-axis and the memory used displayed on the Y-axis according to one embodiment of the present invention. By way of example, the graph of FIG. 2 includes up to one week of samples collected by a collector running on the VM. The virtual memory size 410 is shown as a horizontal line at 8 GB, and the potential heap size 420 shown at different levels in time. The other memory 430 shows the total non-heap memory in use in the guest. The committed heap 440 shows how much of the potential heap is committed.

Figure 3:
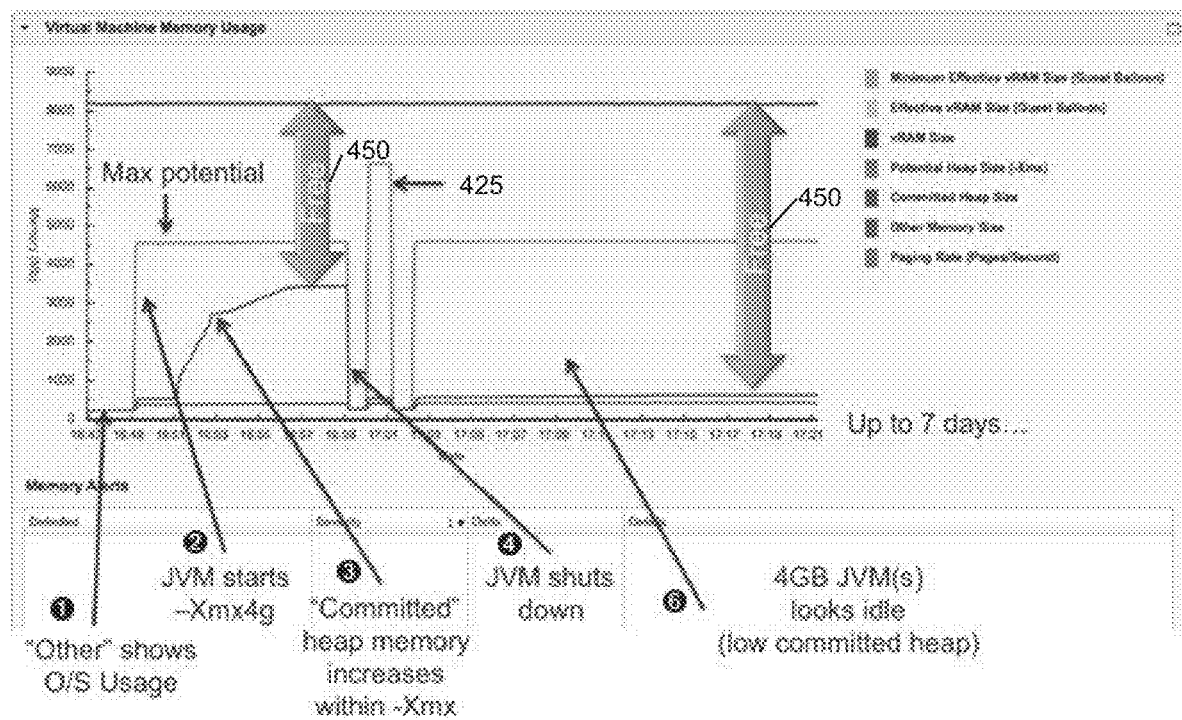
FIG. 3 illustrates in graphical format of memory usage wherein with memory in Mb on the y-axis and time on the X-axis, according to an embodiment of the present invention.

FIG. 3 illustrates in graphical format of memory usage wherein with memory in Mb on the y-axis and time on the X-axis, according to an embodiment of the present invention. With reference to FIG. 3, the VM memory size 410, also called the vRAM Size, is fixed at 8 GB. Memory between 0 and the vRAM line is next divided up into the various categories.

One example of operation may be that the first JVM starts up. The JVM is configured with −Xmx4g, so the JVM has a maximum potential heap memory usage of 4 GB. The 4 GB is added to the other memory 430, resulting in the potential heap 420. The potential heap 420 is therefore the high water mark that this JVM could possibly consume if the JVMs heap became fully committed. Note that this could in fact be two JVMs starting simultaneously with 2 GB heaps. The historical graphing does not distinguish between individual JVM processes. After the first JVM starts up, the JVM comes under load and the committed heap 440 shows how much of the potential heap 420 is committed. Committed memory 440 often grows slowly until the JVM reaches the potential heap size, at which point heap size cannot grow any further. As such, the gap between the light blue potential heap size 420 and the vRAM Size 410 is guest memory that is guaranteed to be available no matter how much load the JVM experiences. The gap between the committed heap size 440 and the vRAM Size 410 is the guest memory that is actually free in that moment, as represented by the "Free" arrows 450 in FIG. 5.

If the first JVM shuts down, the committed memory may be freed back to the guest. The other memory size 430 also drops a little representing the native JVM memory that is also freed.

In this example, a JVM with a 6 GB heap starts and shuts down moments later as designated by element 425. At this point, a 4 GB JVM is restarted, but this time remains idle leaving a lot of free memory available to the guest. According to FIG. 3, the 4 GB JVM is idle, as the committed heap remains very low.

The foregoing example is simply presented to offer a scenario in which the present invention will be utilized.

The JVM heap can vary current heap size between two preconfigured memory boundaries—the initial heap size (defined by the −Xms option) and the maximum heap size (defined by the −Xmx option). The operating system, however, will commit memory to the heap lazily as memory is used, so this results in a number of different memory metrics that must be considered.

Figure 4:
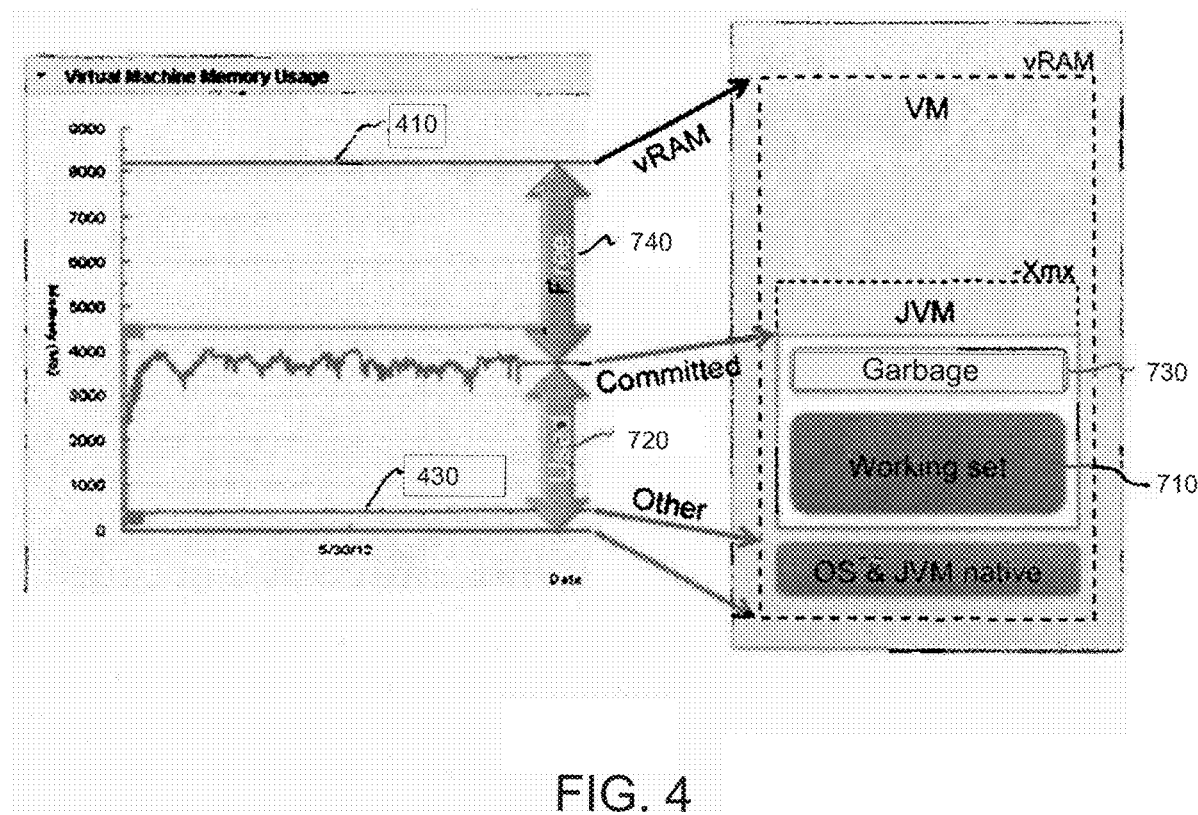
FIG. 4 illustrates a Virtual Machine Memory Usage graph that represents different types of memory use in a VM.

FIG. 4 illustrates a Virtual Machine Memory Usage graph that represents different types of memory use in a VM. In FIG. 4, the historical memory graph is represented as a bar graph to show how the total memory in the guest is distributed between the different memory categories, with conflicting memory demands. It is important to understand the cumulative nature of these measurements. By way of example, the working set 710 could be considered the totality of live objects in the heap; the used memory 720 from the perspective of the JVM is defined as the working set 710 plus garbage 730; and the free memory 740 is defined as the current heap (vRAM) size 410 minus used memory 720.

With conventional systems, the guest allocates memory imprecisely to the JVM heap and the difference between free and used memory 740, 720 is not readily apparent to the guest; therefore, the guest commits memory to the JVM heap as memory is required. The committed memory 440, therefore, is a measure of how much memory the JVM heap is really consuming in the guest. If (−Xms<−Xmx) and (Used memory==Current heap size), the JVM is likely to grow the JVM heap after a full garbage collection. However if (−Xms or Current heap size==−Xmx), either through heap growth or configuration, the heap cannot grow any further.

According to the present invention, a system and method is provided to predict the usage of the heap based on checking the allocation rate at regular intervals. The allocation rate combines both the historical allocation as well the current rate, and the invention extrapolates the rate at which the remaining free heap memory is going to be used up based on the current rate of allocation. Essentially, using statistical analysis of historical memory data and deviation, one may examine the current allocation rate to predict the time to exhaust committed memory as described below.

In accordance with this invention, the system and method decides how long the free memory is going to last and based on a number of user inputs (such as thresholds, the Max/Min amount of heap that can be freed, etc.). There is an assessment of the amount of memory that can be either freed and given back to the Operating System or committed back to the heap from the Operating System. An algorithm will work closely in conjunction with the garbage collection module 307 and will be an extension of the same; herein called the GC extension 311.

For example, the GC extension 311 will have access to the core GC metrics, such as current rate of allocation, free heap memory, committed memory, Max heap size, Min heap size, Max free memory that can be freed, Min free memory that can be freed etc. The GC extension 311 may read the free memory and records free memory at regular intervals. The extension 311 may use the recorded free memory data for a defined time length to compute average allocation rate and a deviation factor from the allocation rate. The GC extension uses these values to project when an Out Of Memory (OOM) can occur. OOM in Java is one problem which is more due to system's limitation (memory) rather than due to programming mistakes in most cases though in certain cases one may have memory leak which causes an Out Of Memory Error.

If the projected time when the memory is going to be exhausted is above a high threshold, the invention will safely give up memory back to the OS even accounting for any sudden spurts in allocation rate. Alternatively, if the projected time is lesser than a lower threshold, one may immediately recover the memory back from the OS, thus anticipating the memory need before the need arises.

The present invention also accounts for events such as "OOM situation", "High Watermark Memory Threshold", "Application going into Idle state", "Application going into Active state". The invention takes appropriate action keeping in mind to free the maximum possible resources without affecting performance.

In systems where several runtimes share memory resources amongst each other, the amount of time that a particular runtime holds on to a resource is very important. By predicting the length of time a given amount of memory is going to be unused by a certain runtime, the invention can estimate the amount of memory that can be freed and thus shared amongst other Runtimes that are sharing the same set of resources.

Advantages or clear differentiators provided by the present invention include:
1. The system uses the existing memory management attributes rather than waiting for specific memory events (such as OOM)
2. The decision of sharing is based on the memory usage pattern of the current workload.
3. The Runtimes only hold on to as much resources as the Runtimes need (plus a buffer to account for any sudden changes in the resource requirements).
4. This method is scalable as each Runtime makes a decision based on a set of needs internally monitored parameters and does not depend on external factors
5. This method is not specific to any Language Runtime or even the type of GC 307.

Additionally, this system and method of this invention allows a JVM to self-regulate the amount of resources the JVM consumes based on projected need and thus makes the most optimum use of the resources; by using only the amount of resources that are needed, a user may pack in more Runtimes that are sharing a given set of resources; cost of resources are lowered; the most efficient use of resources are provided without affecting performance; and multiple Runtimes sharing a given set of resources is a very common scenario both in cloud as well as non-cloud (on premise).

The committed size 440 is the actual allocated memory, the used size is the size used for storing actual data. The Max size is the hard limit to which the heap can grow—if it's not enough the JVM issues an Out Of Memory Error.

If a memory is committed, the committed memory can be used. Also, the only occasion when JVM would not be able to commit more memory (on a modern OS) is if the hardware is out of virtual memory. All these heap region sizes only tell an operator the size of the heap region. The JVM has other memory regions as well (thread stacks, JIT cache, etc.) The heap region is usually largest, which roughly corresponds to the process footprint.

Figure 5:
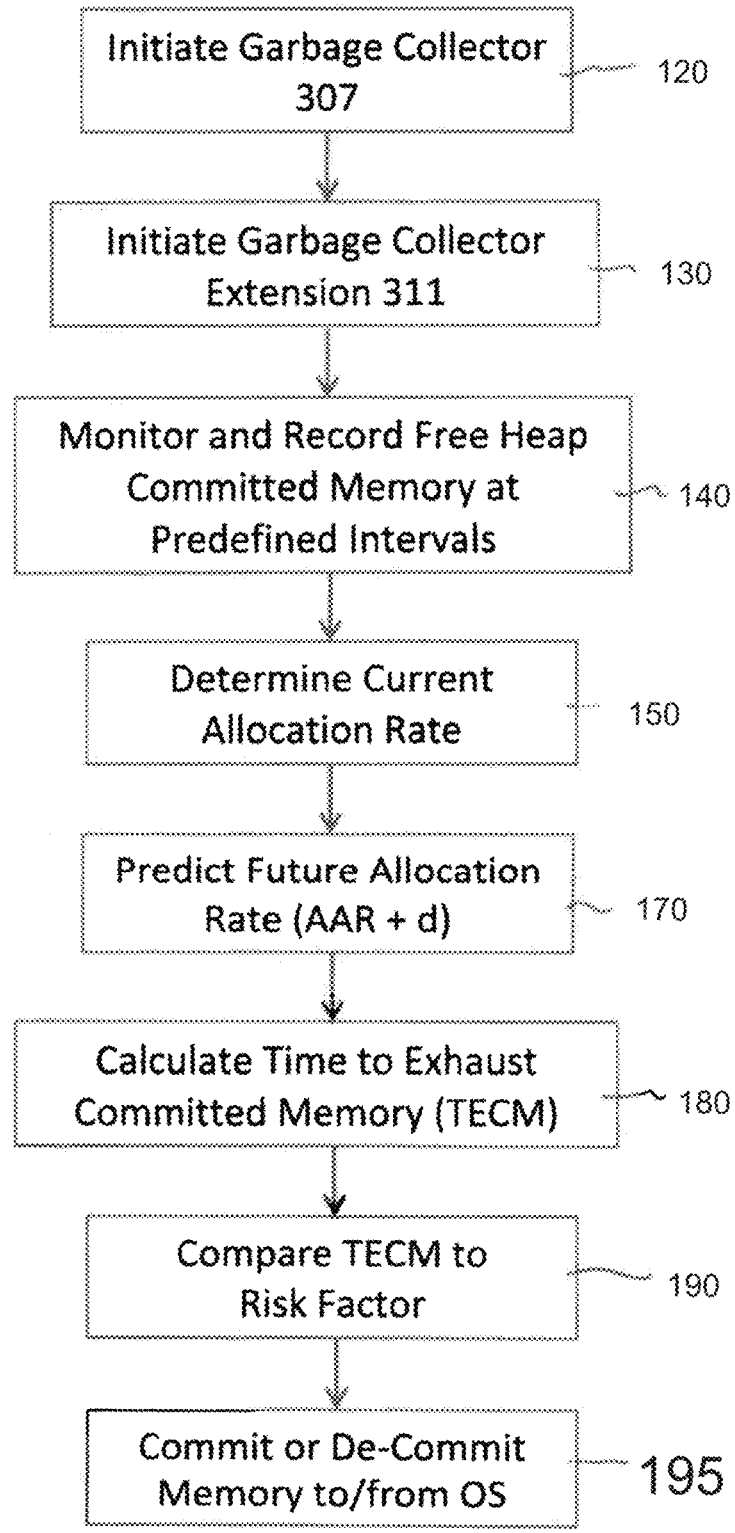
FIG. 5 illustrates a flowchart of the steps to predict the usage of the heap based on checking the allocation rate at regular intervals, according to an embodiment of the present invention.

FIG. 5 illustrates a flowchart of the steps to predict the usage of the heap based on checking the allocation rate at regular intervals, according to an embodiment of the present invention. In accordance with the invention, the garbage collector 307 is assisted by means of a garbage collector extension 311 that consists of a monitor loop. The monitor loop continuously records the free committed heap memory at a defined interval; e.g., interval time is 60 seconds. According to the invention, a garbage collector 307 which may consist of multiple programs, agent or other suitable programmable systems as known in the art, is initiated at step 120. Next, at step 130, the system initiates the garbage collector extension 311 which is essentially a monitor loop. Based on a predetermined interval of time, the system at step 140 monitors and records the free committed heap memory at predefined intervals. Having stored the historical data of free committed heap memory at step 140, the system calculates the average allocation rate (AAR) over a period of time determine by an operator of the system who likewise determines the interval of time assessment used in step 140. In short, the system at step 150 calculates the average allocation rate (AAR) based on the amount of memory that was allocated since the last interval. Next, the system of the invention calculates a standard deviation from the previously computed AAR at step 160 using traditional mathematical calculation techniques for determining standard deviation ($\sigma$ (sigma) or SD). According to the present invention, allocation rate (AR) is a factor of the AAR and the deviation which is determined at step 170. At step 180, the present invention determines how long the memory is going to last based on current AR, wherein the Time to Exhaust Committed Memory (TECM) equals the Free Committed Memory (e.g., measured as GBs) divided by the allocation rate (AR) (e.g., measured as GBs per unit time). Then, the system compares the TECM to a system-imposed risk factor at step 190 to determine whether additional memory needs to be committed to the OS or memory needs to be de-committed with respect to the OS (step 195).

Figure 6:
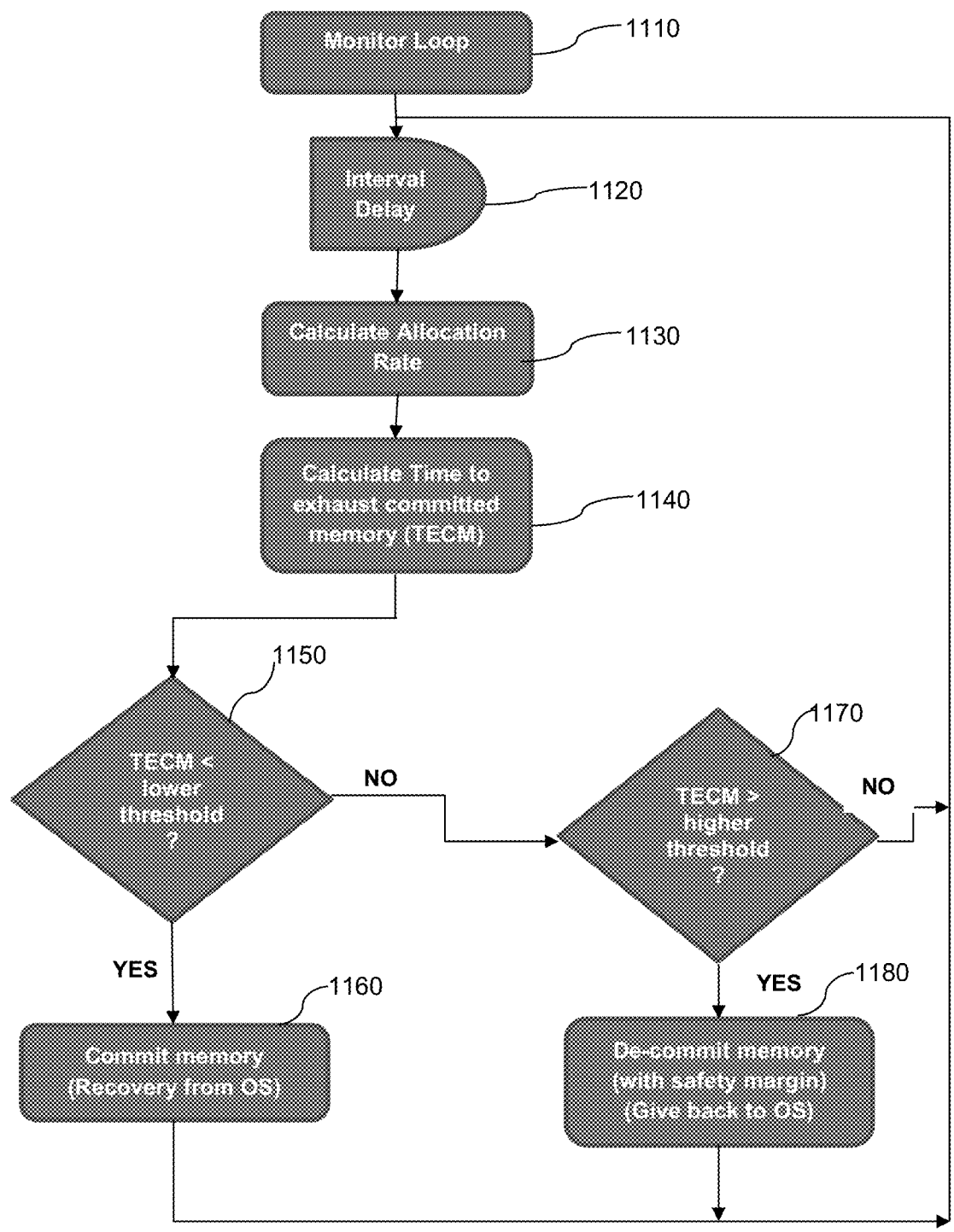
FIG. 6 illustrates a flowchart of the steps utilized to commit or de-commit memory to and from the operating system, in accordance with an embodiment of the present invention.

FIG. 6 illustrates a flowchart of the steps utilized to commit or de-commit memory to and from the operating system, in accordance with an embodiment of the present invention. With reference to FIG. 6, the garbage collector extension 311 is enabled (step 130) to initiate the monitor loop at 1110. An interval delay is instituted at 1120 and the average allocation rate (AAR) is calculated at 1130 according the steps outlined in FIG. 6. As described above, the time to exhaust committed memory (TECM) is calculated at 1140 according to step 180 of FIG. 6. Next, the system considers the thresholds to determine if the system needs to take action regarding JVM memory. At 1150, the TECM is compared to the low time threshold (LTT), for example, 2 minutes, that is, the free memory will only last for the next 2 minutes as per the current AR. If TECM<LTT at 1150, the system is are running out of memory quickly; therefore, the system may need to recover memory from the operating system to prevent an out of memory (OOM) error at 1160.

Alternatively, at 1170, the TECM is compared to the high time threshold (HTT), for example, 20 minutes, that is, the free memory will last for more than 20 minutes as per the current AR. If TECM>HTT at 1170, the system has excess free memory to spare and can release some to the OS; i.e., the system may de-commit memory within safety margins back to the operating system at 1180.

Figure 7:
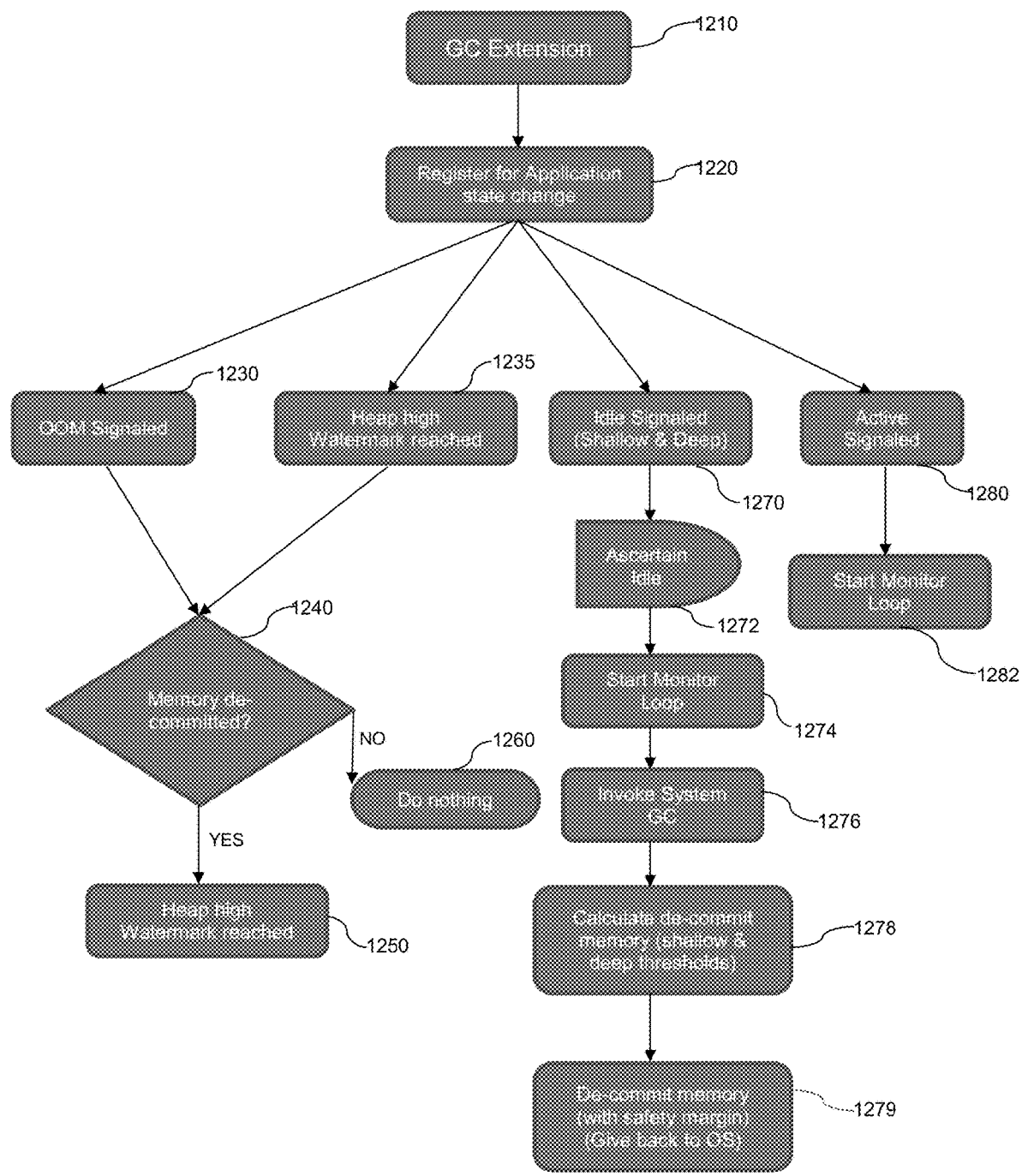
FIG. 7 is a flowchart showing steps to accomplish monitoring of JVM application state changes in according with an embodiment of the present invention.

FIG. 7 is a flowchart showing steps to accomplish monitoring of JVM application state changes in according with an embodiment of the present invention. The garbage collector extension 311 additionally registers for any application state changes, which include, for example, situations such as an "OOM situation", "High Watermark Memory Threshold", "Application going into Idle state", and "Application going into Active state". With reference to FIG. 7, the garbage collector extension 311 is initiated at 1210 and begins to monitor or register for application state change at 1220. At 1230, the system may identify whether an OOM event has been identified, and at 1240 the system checks if memory has been de-committed in the monitor loop at 1240 (see also FIG. 9). If memory has been de-committed, memory is recovered back from the operating system at 1250. If not, no action is taken (1260). Alternatively, if the system determines at 1235 that a high memory threshold (heap) has been reached, again at 1240 the system checks if memory has been de-committed in the monitor loop at 1240 (see also FIG. 6).

The system of the invention further monitors whether an idle state has been identified at 1270. When an idle event (e.g., transition from active to shallow idle or shallow idle to deep idle) at 1270, the system ascertains the type of idle at 1272, because are multiple levels of idle (e.g., shallow and deep) exist and the system ascertains that the Idle is not a temporary state requiring the system to stop the Monitor Loop 1110 at 1274. The system may force a full garbage collection at to ensure that the maximum memory can be freed at 1276. At 1278, 1279, a decision to free up memory is made. If shallow idle id identified, the system releases smaller amounts of memory back to the operating system, and, on deep idle, the maximum permissible limit of memory is freed back to the operating system. The cost of returning back from deep idle to active is high as compared to shallow idle to active idle.

When an active event is identified at 1280 (e.g., transition from (any) Idle to active state, the Monitor Loop is restarted at 1282.

According to the present example, the system monitor 308 collects the information for each time interval and stores the information in the history profile information repository 315 for each JVM. In this way, the history profile information repository 315 maintains information for each JVM over several time intervals such that the garbage collector extension 311 can refer to this information and make decisions regarding allocating memory to each of multiple JVMs in the computer system 102. A software system (e.g., a Profile Analyzer) scans the history profile information repository and determines usage patterns by the JVM(s) for different resources including heap usage pattern. Based on the heap usage pattern, the software system Profile Analyzer notifies JVM about impending high allocation rate event. The JVM determines if the memory has to be recovered back from the operating system upon receiving the high allocation rate event.

In summary, the garbage collector extension 311 makes a decision whether to vary a maximum heap memory size for one application of a plurality of applications based on monitoring a garbage collection activity level for the application being one of outside and inside of a hysteresis region defined by an upper threshold and a lower threshold of garbage collection activity level for a distribution of garbage collection activity levels monitored for the plurality of applications while running on the information processing system. The garbage collector extension 311 makes a decision to vary a maximum heap memory size for an application of the plurality of applications based on monitoring a garbage collection activity level for the application being outside of the hysteresis region. The garbage collector extension 311 makes a decision to not vary a maximum heap memory size for the application based on monitoring a garbage collection activity level for the application being inside of the hysteresis region. This is only one example of how the garbage collector extension 311 may allocate memory to a JVM in a set of JVMs in a computer system 102.

Figure 8:
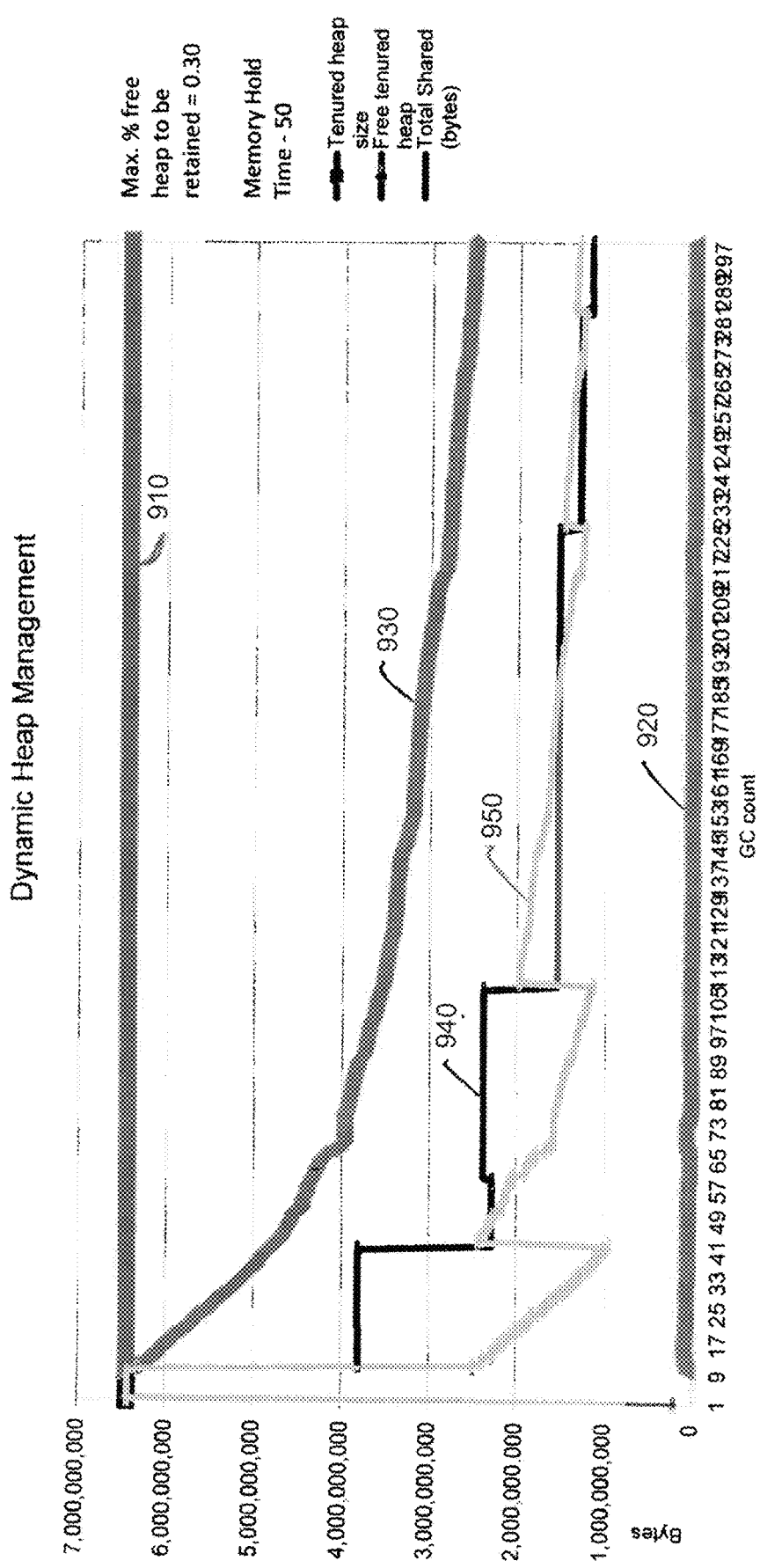
FIG. 8 illustrates a graph showing the data related to a working example of dynamic heap management according to an embodiment of the present invention.

FIG. 8 illustrates a graph showing the data related to a working example of dynamic heap management according to an embodiment of the present invention. The example provided in FIG. 8 is an application of the algorithm of the present invention as applied to Generational Concurrent (GC) Policy, of which there are several GC policies such as optavgpause, optthruput, balanced, etc. as will be understood by those of skill in the art. As shown in FIG. 8, memory is shown on the y-axis in bytes and garbage collector count is shown on the x-axis. Garbage collector count (GC count) is a unique feature of the invention wherein time is measured by the interval between garbage collector readings, where a garbage collection occurs every time a memory threshold is exceeded due to memory allocation. Thus, the x-axis does not measure time in a linear fashion as with a clock, but instead, the graph of FIG. 8 measures time based on the GC count, which is non-linear and depends on memory usage and allocation. In this example, the graph along the x-axis is measured using every 9 samples of the garbage collector count. As with the example above with reference to FIGS. 2-4, the maximum committed heap size (vRAM) 910 is shown by the horizontal line at approximately 6.4 Gb. The allocation rate 920 may vary dramatically in short bursts of time, which depend heavily on the day, week and time of the year being analyzed.

FIG. 8 further illustrates the total shared memory 940 and the actual free memory 950 as calculated using the algorithm described in more detail below. For purposes of the algorithm utilized by this invention, it is noted that allocation is determined for specific intervals, wherein the allocation by an application between points on the x-axis is between two readings (i.e., GC count_x–G count_x–1). Average allocation is based on the last number (n) of allocation readings divided by the number of readings (n). In the example of FIG. 8, ten (10) readings were used as the number of readings. Next, the standard deviation is calculated using conventional means for calculating standard deviation. Based on the average allocation and the standard deviation, the system next calculates the allocation rate, which is defined as average allocation plus standard deviation.

Having compiled data associated with the allocation rate and the free committed or tenured heap size, the system calculates the time to exhaust the committee memory (TECM) or the time fill up the memory. The time to fill (i.e., the TECM) is defines as the free committed heap size divided by the allocation rate.

In the example of FIG. 8, it is important to note that the operator, whether human or computer, determines the maximum percent (%) of free heap to be retained, which in this example is 0.30%, and the risk factor, which in this example is set to be 50 minutes of memory hold time. The operator may vary the percent of free to be retained and the memory hold time depending on the project to be run and the risk factors to be assessed to a particular situation. These factors will help govern the amount of memory to commit or de-commit to the OS. As shown in FIG. 8, the free tenured heap 930 is illustrates as a downward sloping parabolic line showing the free committed heap memory at particular points in time, where again time is measured along the x-axis as GC count.

Next, the system calculates the free memory that can be shared which is equal to the time to fill (TECM) minus the risk factor or hold memory, which in this example is 50 minutes. By way of example, the time to fill at GC count 10 is 126.02 minutes and the risk factor is set to be 50 minutes. Given the fact that at GC count 10 the allocation rate is 50,115,870 bytes per minute, the free memory that can be shared equals 3,809,974,306 bytes.

Figure 9:
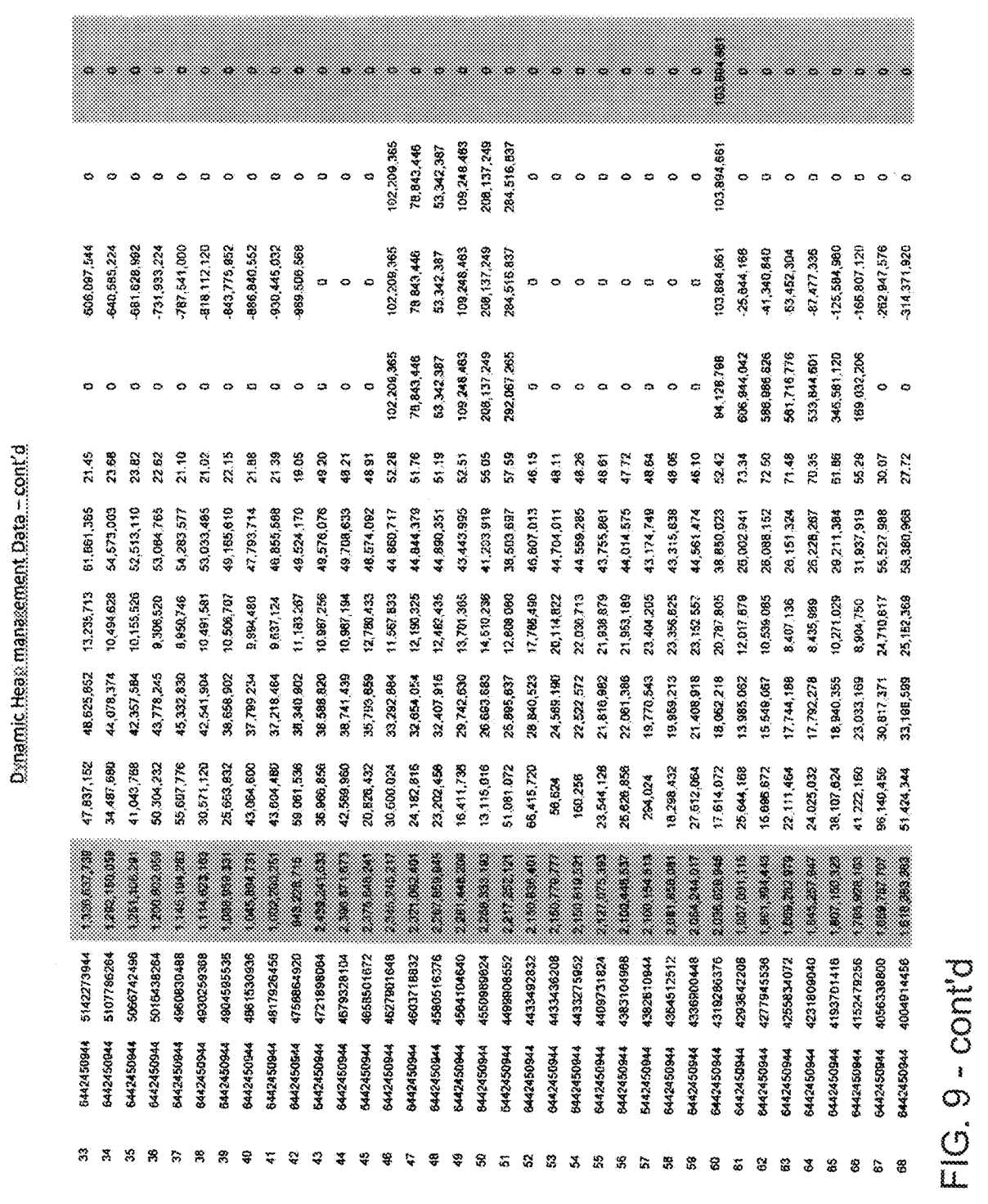
Figure 9:
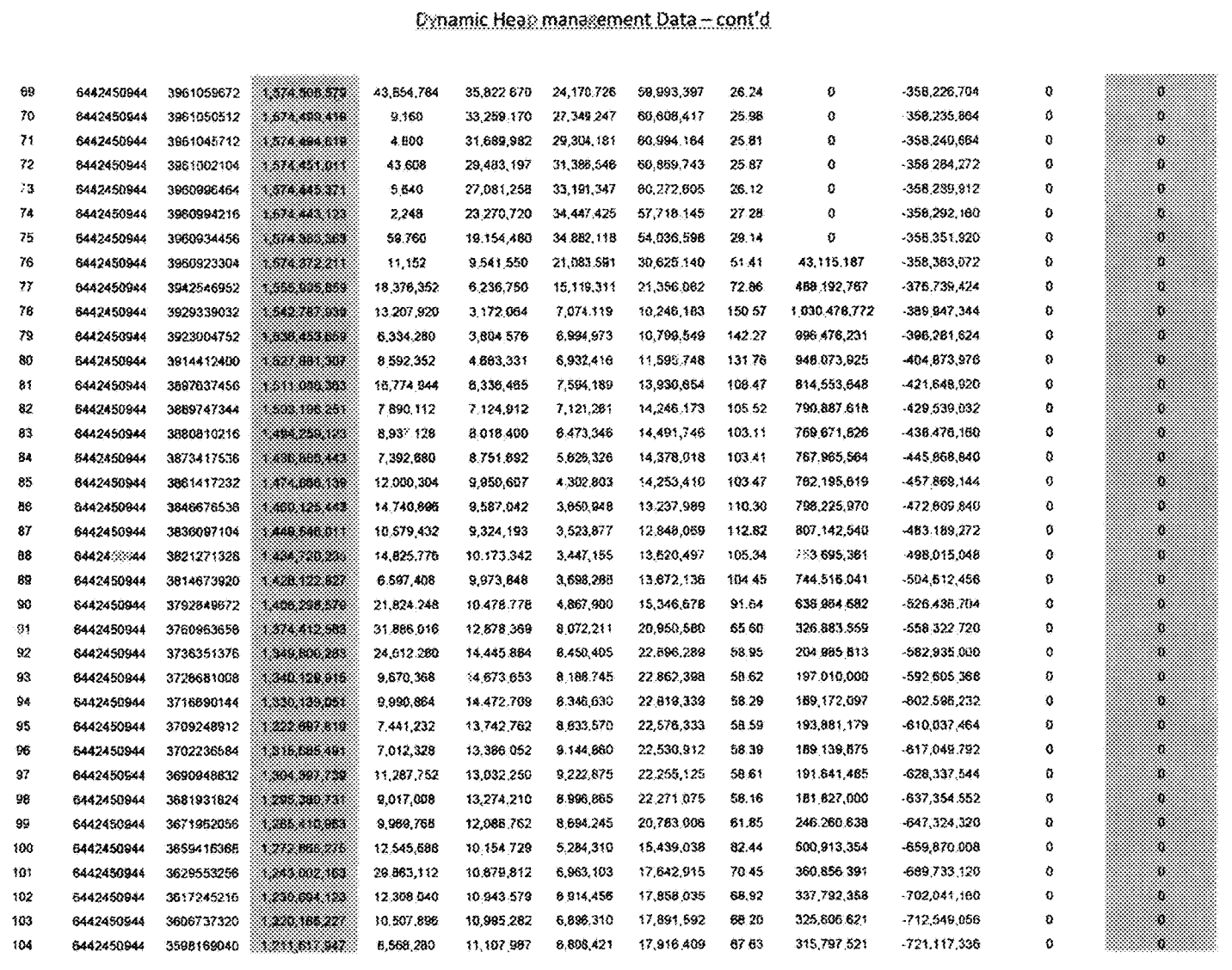

FIG. 9 illustrates a table of data used as an exemplary dynamic heap management table according to an embodiment of the present invention. The table of data shown in FIG. 9 is a sample of data forming the graph of FIG. 8 but only for the GC count of 0 to 144.

According to process of the present invention, a comparison is made between the time to exhaust committed memory and the thresholds defined by the operator(s) as set forth in the flowcharts of FIGS. 7 and 8. More specifically, the process according to the present invention compares the memory that can be shared with a percentage of the free committed heap size that fits within a suitable risk factor system defined by the operator(s); namely, the operators are able to control the "hold time" for memory, which is set to be 50 minutes in this example, and the maximum percent of free heap to be retained, which in this example is set to 0.30%. The following algorithm is employed to determine whether memory should be committed or de-committed with respect to the operating system.

The algorithm may be expressed as the "Free Memory that can be shared" as shown in the Eleventh Column in FIG. 9, which is expressed as:

---
IF (
  (Free Commit Heap Size – (MAX % of Free Heap To be Retained * Free Commit Heap Size)) > Free Memory that can be shared (Twelfth Column in FIG. 9)
  )
  THEN
    Free Memory that can be shared (Twelfth Column in FIG. 9)
  ELSE
    (Free Commit Heap Size – (MAX % of Free Heap To be Retained * Free Commit Heap Size))
  ENDIF
---

The foregoing algorithm essentially represents the steps 1150 and 1170 in FIG. 6 and step 1240 in FIG. 7.

The terms "heap" or "heap memory" are intended to broadly refer to the memory area managed using garbage collection and is not specific to the Java programming language or specific to any other programming language. The term "run-time system" in the context of the present disclosure is intended to broadly refer to a run-time operating environment or platform for executing a compatible application thereon, and which executes the application on a processing system. Optionally, the run-time system executes the application in coordination with an operating system on a processing system. The application may, but not necessarily, include the run-time system. For example, and not for limitation, a Java application may execute on a Java Virtual Machine run-time system.

As described above, the method and system of this invention further registers for events such as "OOM situation", "High Watermark Memory Threshold", "Application going into Idle state", "Application going into Active state". The system takes appropriate action keeping in mind to free the maximum possible resources without affecting performance.

In addition to these events, the system also provides a mechanism to react to high allocation periods pre-determined by profiling the application usage over a period of time. This mechanism and system assumes an external data store (e.g., called the "application profile store") exists, which maintains application usage as fed by JVM(s) running the application over regular interval (for example every hour). Another external agent (e.g., called the "application profile analyzer" or APA) has the ability to infer data in application profile store and detect the usage period (e.g., time of day, weekdays or weekends, specific days in year) around certain characteristics. The external agent may infer from the data stored in application profile store that the application has high allocation rate starting from 9 AM on weekdays. In this instance, the JVM(s) would register with the application profile analyzer for such specific usage events, in this case high allocation periods. The application profile analyzer is responsible for notifying the JVM about high allocation usage event(s) in near future. On receiving such notification the JVM(s) would check their heap state and if the JVM has de-committed any heap earlier, the JVM would commit that back (recover from OS) to handle the expected high allocation rate. These and other benefits of the present invention will become apparent from the following description and related drawings.

Figure 10:
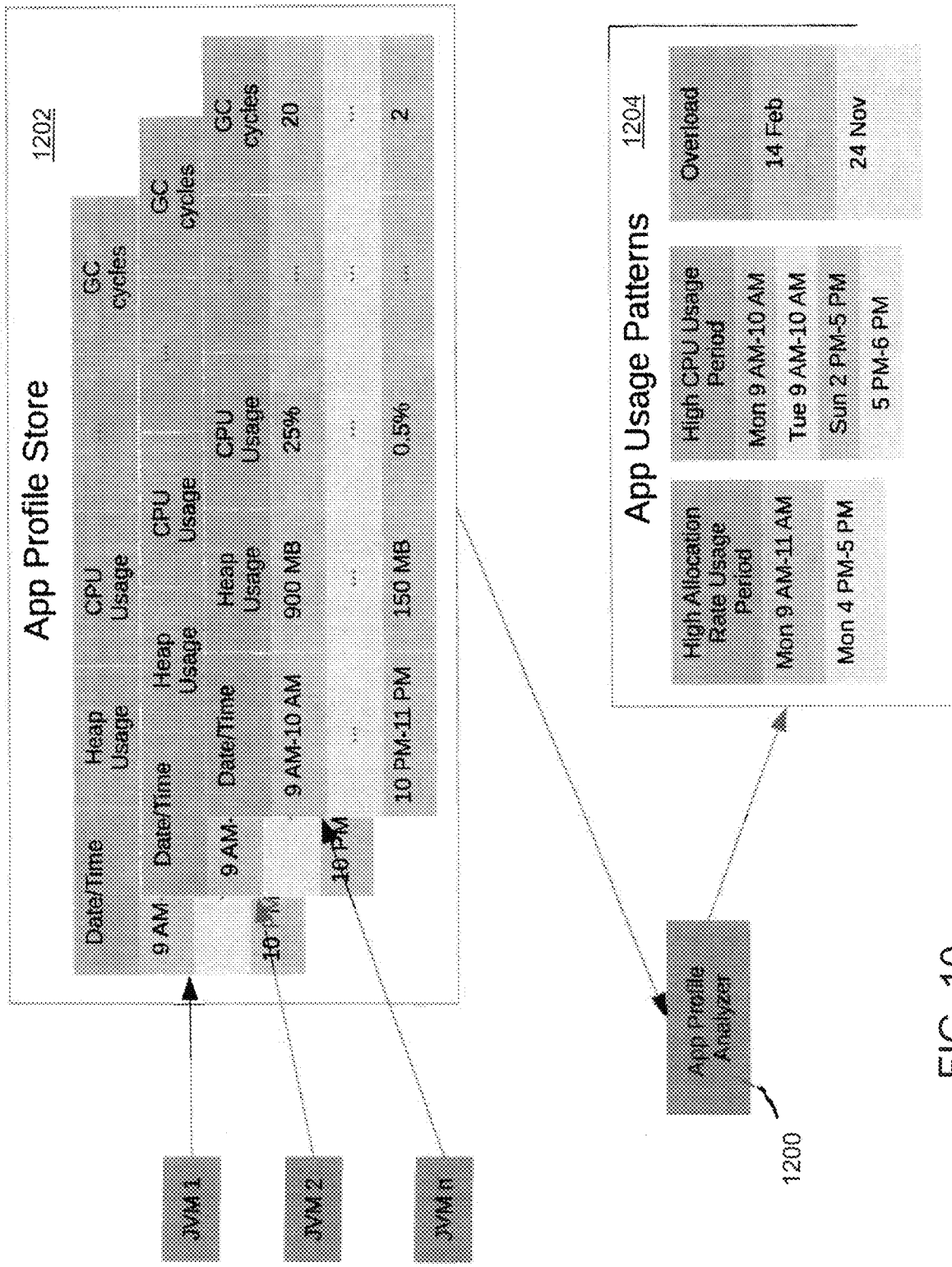
FIG. 10 is a schematic showing interaction of an application profile store and application profile analyzer in accordance with an embodiment of the present invention.

FIG. 10 is a schematic showing interaction of an application profile store and application profile analyzer in accordance with an embodiment of the present invention. The application profile store 1202 is provided for each JVM (see JVM1, JVM2, JVMn) and tracks data for each JVM including heap usage, CPU usage, GC cycles, etc. for specific times of the day, days of the week, and calendar days, holidays, and so on. The application profile store 1202 communicates with the application profile analyzer (APA) 1200 to track and record periods of high allocation rates, high CPU usage and instances of overload to maintain a history of application usage patterns 1204.

Figure 11:
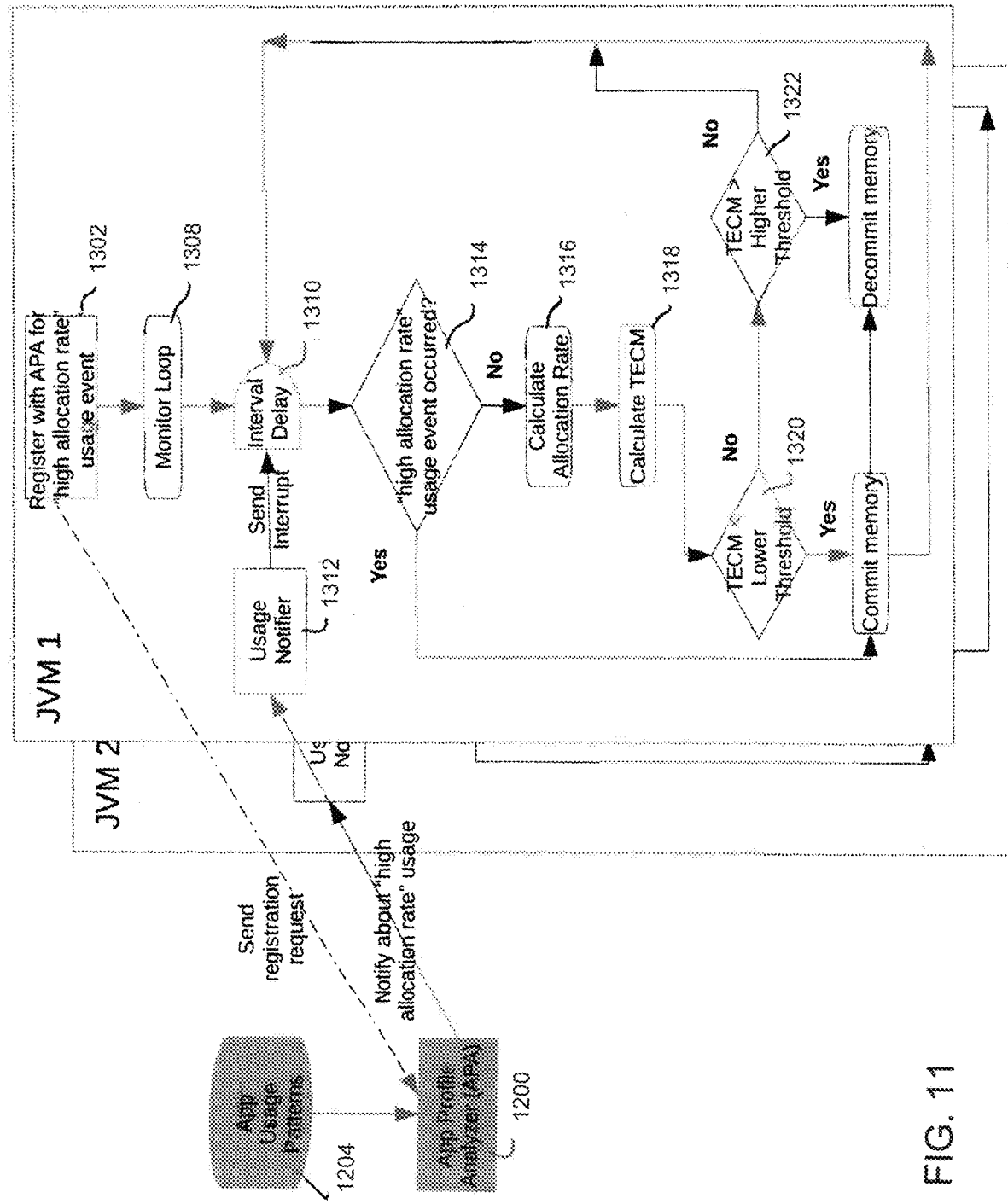
FIG. 11 is a flowchart of steps utilized to commit or de-commit memory to and from the operating system and using the application profile store and application profile analyzer, in accordance with an embodiment of the present invention.

FIG. 11 is a flowchart of steps utilized to commit or de-commit memory to and from the operating system and using the application profile store and application profile analyzer, in accordance with an embodiment of the present invention. In FIG. 11, the flowcharts for JVM1 and JVM2 are superimposed on one another but utilize the same steps. With reference to FIG. 11, each JVM registers at step 1302 with the application profile analyzer (APA) 1200 for specific usage events, e.g., high allocation periods. The application profile analyzer 1200 is next responsible for notifying the JVM about high allocation usage events in the future. Once receiving such notification, the JVM(s) check respective heap states as set forth in FIG. 11. At step 1308, the system begins the monitor loop similar in the manner described above with respect to FIG. 6. The garbage collector extension 311 is enabled to initiate the monitor loop at 1308. An interval delay is instituted at 1310, wherein a usage notifier receives data from the application profile analyzer 120 and may sends an interrupt signal to the system at step 1312 depending on the circumstances described above. Next, the system determines whether a high allocation rate" usage event has occurred at step 1314, wherein the system commits memory to the OS as described above. If such event has not yet occurred, the system determines the allocation rate at step 1316 and the average allocation rate (AAR) is calculated according the steps outlined in FIG. 6 and described above. Next, the time to exhaust committed memory (TECM) is calculated at 1318 according to the methodology described above. Next, the system considers the thresholds to determine if the system needs to take action regarding JVM memory. At 1320, the TECM is compared to the low time threshold (LTT), for example, 2 minutes, that is, the free memory will only last for the next 2 minutes as per the current AR. If TECM<LTT at 1320, the system is are running out of memory quickly; therefore, the system may need to recover memory from the operating system to prevent an out of memory (OOM) error.

Alternatively, at 1322, the TECM is compared to the high time threshold (HTT), for example, 20 minutes, that is, the free memory will last for more than 20 minutes as per the current AR. If TECM>HTT at 1322, the system has excess free memory to spare and can release some to the OS; i.e., the system may de-commit memory within safety margins back to the operating system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, it is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
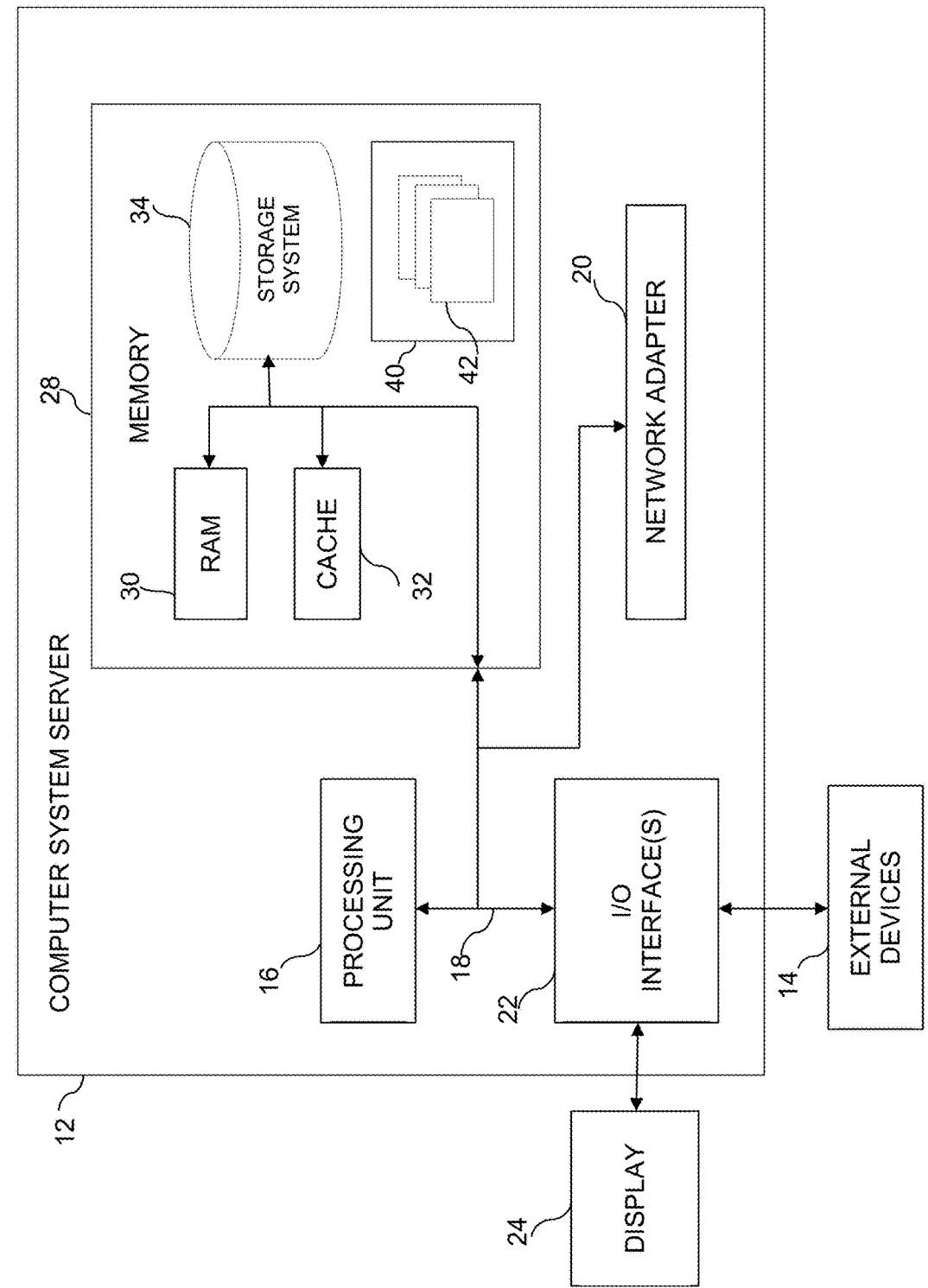
FIG. 12 depicts a cloud computing node according to an embodiment of the present invention.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 a computer system/server 12 is provided which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
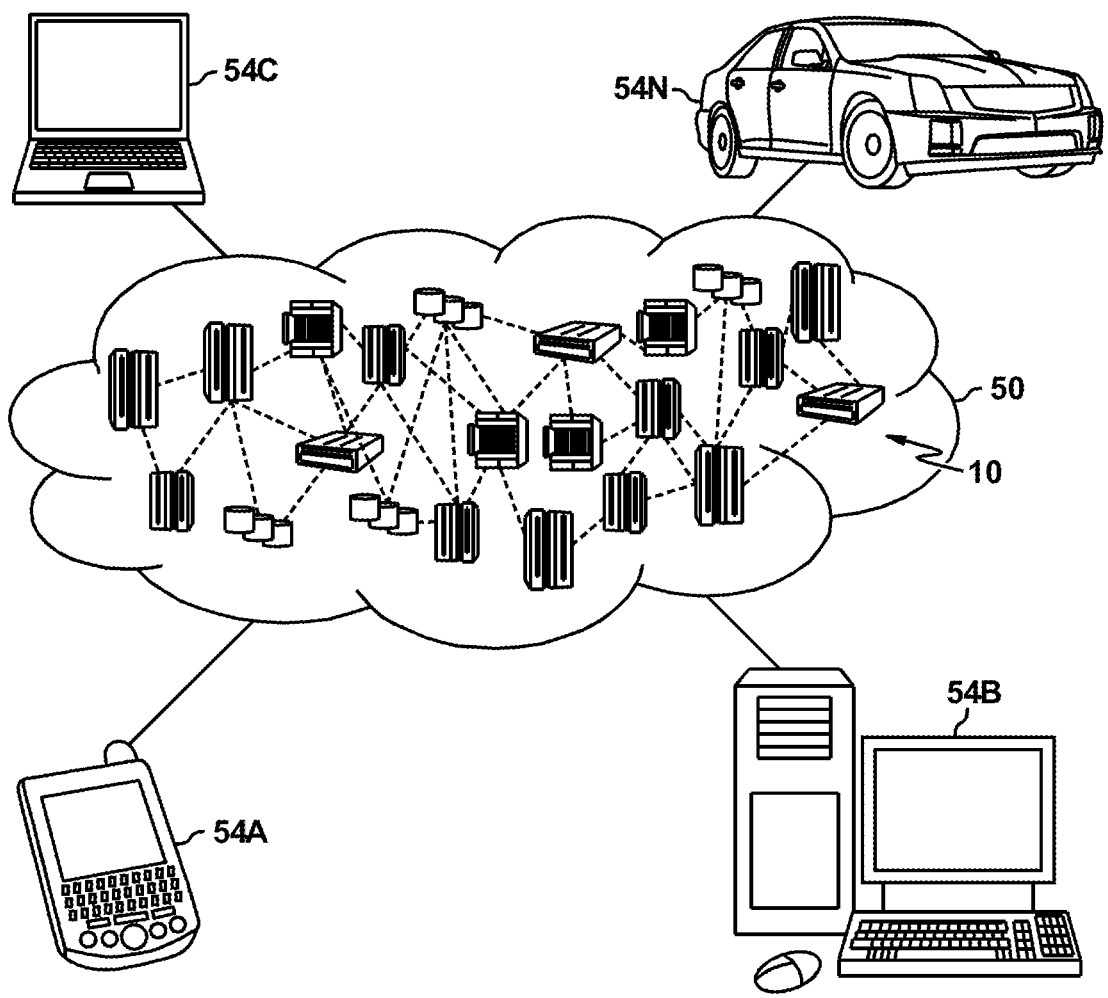
FIG. 13 depicts a cloud computing environment according to an embodiment of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
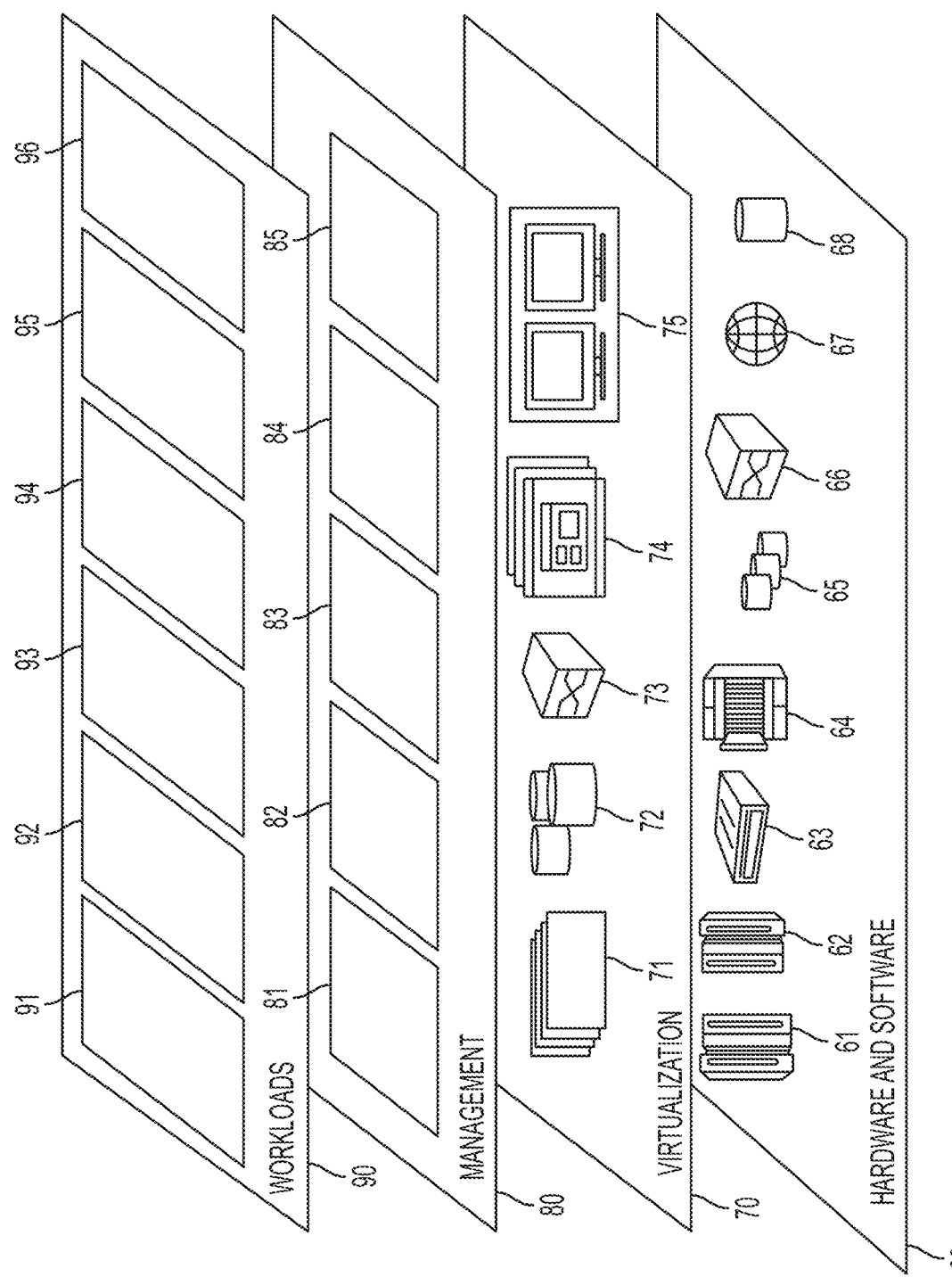
FIG. 14 depicts abstraction model layers according to an embodiment of the present invention.

Referring now to FIG. 14, a set of functional abstraction layers provided by cloud computing environment 50 (FIG. 10) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system 96 for automatically self-regulating memory for a Java virtual machine (JVM) to optimize memory use by the JVM and by an operating system.

Based on the foregoing disclosure, it is clear that the present invention provides a method for automatically self-regulating memory for a JAVA virtual machine (JVM) to optimize memory use by the JVM and by an operating system. An extension to the garbage collector (memory optimizer) monitors free committed memory of a JVM at predetermined intervals. The memory optimizer records the free committed memory at the predetermined intervals over time to define a historical record of previously committed memory. The memory optimizer calculates average allocation rate based on the recorded free committed memory in the historical record. An allocation rate of the committed memory is determined by the memory optimizer, wherein the allocation rate is based on the average allocation rate over a second selected number of predetermined intervals. The memory optimizer calculates an estimated time to exhaust committed memory based on free tenured heap and the allocation rate. The memory optimizer compares the estimated time to exhaust committed memory with at least one threshold value. Memory is committed to or de-committed from an operating system based on the step of comparing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for automatically varying a maximum heap memory size for at least one Java virtual machine (JVM), said method comprising the steps of:
    monitoring, by a computer running a garbage collector extension, a size of free committed memory to the at least one JVM;
    calculating, by the computer, an average size of the monitored free committed memory;
    determining, by the computer, an allocation rate of the free committed memory, the allocation rate being based on the calculated average size;
    calculating, by the computer, an estimated time to exhaust free committed memory based on the allocation rate;
    comparing, by the computer, the calculated estimated time to exhaust free committed memory with a predetermined threshold value; and
    varying, by the computer, the maximum heap memory size for the at least one JVM based on the step of comparing.

2. The method of claim 1, wherein the predetermined threshold value comprises a hysteresis region defined by an upper threshold and a lower threshold.

3. The method of claim 2, wherein the calculated estimated time to exhaust free committed memory is also based on an activity level of the garbage collector extension and wherein the upper threshold and lower threshold are thresholds of the activity level of the garbage collector extension.

4. The method of claim 1, further comprising:
    basing the allocation rate on the average size and a standard deviation of the average size.

5. The method of claim 1, further comprising:
    storing data related to the monitored size of free committed memory in a history profile repository for the at least one JVM, wherein the history profile information repository maintains information for the at least one JVM.

6. The method of claim 5, further comprising:
    monitoring an idle event of an operating system on which the at least one JVM runs;
    identifying whether the idle event has occurred; and
    determining if memory has been allocated with respect to the operating system in response to the identification that the idle event has occurred.

7. The method of claim 6, further comprising:
    determining whether the idle event is related to a shallow idle event or a deep idle event.

8. The method of claim 1, further comprising:
    monitoring application state changes at least one of separate and apart from operation of the garbage collector extension.

9. The method of claim 1, further comprising:
    monitoring an out of memory state of an operating system on which the at least one JVM runs;
    identifying whether the out of memory state has occurred; and
    determining if memory has been allocated with respect to the operating system in response to the identification that the out of memory state has occurred.

10. The method of claim 1, further comprising:
    monitoring a high memory threshold of an operating system on which the at least one JVM runs;
    identifying whether the high memory threshold has been reached; and
    determining if memory has been allocated with respect to the operating system in response to the identification that the high memory threshold has been reached.

11. A computer program product comprising:
    a computer-readable storage medium; and
    a computer-readable program code stored in the computer-readable storage medium, the computer readable program code containing instructions executable by a processor of a computer system to implement a method for automatically varying a maximum heap memory size for at least one Java virtual machine (JVM), said method comprising the steps of:
        monitoring a size of free committed memory to the at least one JVM;
        calculating an average size of the monitored free committed memory;
        determining an allocation rate of the free committed memory, the allocation rate being based on the calculated average size;

calculating an estimated time to exhaust free committed memory based on the allocation rate;

comparing the calculated estimated time to exhaust free committed memory with a predetermined threshold value; and varying the maximum heap memory size for the at least one JVM based on the step of comparing.

12. The computer program product of claim 11, wherein the predetermined threshold value comprises a hysteresis region defined by an upper threshold and a lower threshold.

13. The computer program product of claim 12, wherein the calculated estimated time to exhaust free committed memory is also based on an activity level of a garbage collector extension and wherein the upper threshold and lower threshold are thresholds of the activity level of the garbage collector extension.

14. The computer program product of claim 11, the method further comprising:

storing data related to the monitored size of free committed memory in a history profile repository for the at least one JVM, wherein the history profile information repository maintains information for the at least one JVM.

15. The computer program product of claim 14, the method further comprising:

scanning information in the history profile repository;

determining usage patterns by the JVM for different resources including a heap usage pattern;

based on the heap usage pattern, notifying the JVM about an impending high allocation rate event; and determining if memory will be recovered back upon receiving the high allocation rate event.

16. A computer system, comprising:

a processor;

a memory coupled to said processor; and a computer readable storage medium coupled to the processor, the computer readable storage medium containing instructions executable by the processor via the memory to implement a method for automatically varying a maximum heap memory size for at least one Java virtual machine (JVM), said method comprising the steps of:

monitoring a size of free committed memory to the at least one JVM;

calculating an average size of the monitored free committed memory;

determining an allocation rate of the free committed memory, the allocation rate being based on the calculated average size;

calculating an estimated time to exhaust free committed memory based on the allocation rate;

comparing the calculated estimated time to exhaust free committed memory with a predetermined threshold value; and varying the maximum heap memory size for the at least one JVM based on the step of comparing.

17. The computer system of claim 16, wherein the predetermined threshold value comprises a hysteresis region defined by an upper threshold and a lower threshold.

18. The computer system of claim 17, wherein the calculated estimated time to exhaust free committed memory is also based on an activity level of a garbage collector extension and wherein the upper threshold and lower threshold are thresholds of the activity level of the garbage collector extension.

19. The computer system of claim 16, further comprising:

storing data related to the monitored size of free committed memory in a history profile repository for the at least one JVM, wherein the history profile information repository maintains information for the at least one JVM.

20. The computer system of claim 19, further comprising:

scanning information in the history profile repository;

determining usage patterns by the JVM for different resources including a heap usage pattern;

based on the heap usage pattern, notifying the JVM about an impending high allocation rate event; and determining if memory will be recovered back upon receiving the high allocation rate event.

\* \* \* \* \*